United States Patent
Brody et al.

(10) Patent No.: US 6,718,501 B1
(45) Date of Patent: Apr. 6, 2004

(54) COPY PROTECTED DIGITAL AUDIO COMPACT DISC AND METHOD AND SYSTEM FOR PRODUCING SAME

(75) Inventors: Moshe Brody, Kfar Saba (IL); Baruch Sollish, Emmanuel (IL)

(73) Assignee: Macrovision Europe Limited, South Ruislip (GB)

( * ) Notice: Subject to any disclaimer, the term of this patent is extended or adjusted under 35 U.S.C. 154(b) by 112 days.

(21) Appl. No.: 10/148,502

(22) PCT Filed: Nov. 27, 2000

(86) PCT No.: PCT/IL00/00792

§ 371 (c)(1),
(2), (4) Date: May 28, 2002

(87) PCT Pub. No.: WO01/41130

PCT Pub. Date: Jun. 7, 2001

(30) Foreign Application Priority Data

Nov. 30, 1999 (IL) .................................................. 133236

(51) Int. Cl.⁷ .......................... H03M 13/00; H04N 5/91
(52) U.S. Cl. ......................................... 714/752; 386/94
(58) Field of Search ................................ 714/752, 746, 714/800, 758, 803, 701, 702, 718, 719, 769, 770, 771; 386/94, 39, 40, 54, 96; 369/132, 133, 155, 166, 291, 275.5

(56) References Cited

U.S. PATENT DOCUMENTS

| | | | | |
|---|---|---|---|---|
| 5,394,274 A | * | 2/1995 | Kahn | 360/27 |
| 5,513,260 A | * | 4/1996 | Ryan | 380/200 |
| 5,822,288 A | * | 10/1998 | Shinada | 369/47.33 |
| 6,104,679 A | * | 8/2000 | Sollish | 369/53.21 |

* cited by examiner

Primary Examiner—Christine T. Tu

(57) ABSTRACT

A copy-protected digital audio compact disc and method for producing same, such that neither the proper playing of the original nor the enforcement of the copy-protection depends on the use of any special equipment. A pattern of latent noise is incorporated into a digital audio CD by overwriting some of the original audio signal data symbols with grossly-erroneous values, and then overwriting the corresponding error-correction parity symbols in such a way as to create an uncorrectable error in the codewords containing the erroneous values. An ordinary CD player of such a disc will therefore detect each occurrence of a latent noise value as an uncorrectable error and will apply interpolative error-concealment to prevent the output of the error. By appropriately choosing the locations for the overwriting of the erroneous values in such a way that the interpolated value will be substantially identical to the original value, the resulting sound output from the CD player will match that of the original audio signal, so that an ordinary CD audio player will properly reproduce the original audio signal from the protected disc without any superimposed noise. Most commercially-available CD-ROM drives for computers, however, do not employ error-concealment when reading a compact disc as a data source. Depending on the copying software employed with such CD-ROM drives, when an uncorrectable error is detected, either no data is read from the disc, or only the raw uncorrected data is read from the disc. Thus, either substantial portions of the original disc will be uncopyable because of the uncorrectable errors, or the uncorrected raw data of the original will be copied, which will place audible noise on the unauthorized copy. To inhibit unauthorized copying via CD-ROM drives that employ error-concealment, alterations are made to the channel Q mode and/or CRC to disable the ability of the CD-ROM drive to seek to the desired data position.

19 Claims, 26 Drawing Sheets

COPY PROTECTED DIGITAL AUDIO COMPACT DISC AND METHOD AND SYSTEM FOR PRODUCING SAME

CROSS-REFERENCE TO RELATED APPLICATIONS

This application is a U.S. national phase application under 35 U.S.C. §371 based upon co-pending International Application No. PCT/il00/00792 filed Nov. 27, 2000, the entire disclosures of which is incorporated herein by reference. The international application was published in the English language on Jun. 7, 2001 under Publication No. WO 01/41130.

FIELD AND BACKGROUND OF THE INVENTION

The present invention relates to copy protection, and, more particularly, to a method and system for copy-protecting a digital audio compact disc as well as to the resulting copy-protected compact disc.

Types of Compact Disc

The familiar compact disc (CD) has become one of the most highly successful of modem consumer products, with current annual worldwide production and distribution in the billions. Low manufacturing costs, availability of inexpensive recording and playback equipment, reasonably high data densities, extremely high reliability, noise immunity, absence of contact wear during playback, and versatility of the medium underlie the wide popular acceptance of the compact disc. There are two principal kinds of compact disc, distinguished by the nature of the recorded material:

The first kind of compact disc is termed the "audio compact disc", which herein denotes any compact disc on which audible sounds, such as music, speech, and other material in the audible spectrum can be recorded, and which substantially contains only information for reproducing audio signals. The audio compact disc is specified by the International Electrotechnical Commission (IEC) International Standard 908 "Compact disc Digital Audio System", which is substantially the same as the original standard proprietary to Sony Corporation of Japan and Philips Electronics of the Netherlands. This standard is commonly known in the art, and denoted herein, as the "Red Book", and is incorporated by reference for all purposes as if fully set forth herein. The Red Book contains the basic physical specifications for the compact disc as well as the fundamentals of the optical readout of digital audio data therefrom by laser, the "eight-to-fourteen modulation" (EFM) data encoding scheme, the data interleaving, and a concise formulation of the mathematics of the "Cross Interleave Reed-Solomon Code" (CIRC) digital error-correction method used to insure faithful sound reproduction in spite of scratches and other minor physical surface damage a compact disc can be expected to encounter during normal handling. More detailed information pertaining to the audio compact disc is available in popular publications, such as *Principles of Digital Audio*, by Ken C. Pohlman, published by McGraw-Hill, Inc., ISBN 0-07-0504687.

The basic Red Book format, recording, and playback processes for an audio compact disc are illustrated in FIG. 1 and FIG. 2, to which reference is now briefly made. In particular, the principal recording unit specified by the Red Book is a sector 150. Because sector 150 corresponds to a record data block 110 (FIG. 1) containing 2,352 usable bytes of data, the playback of the audio compact disc results in a playback data block 235 (FIG. 2) which also contains 2,352 bytes of audio data. The Red Book standard parameters are such that 75 consecutive sectors of audio data represent one second of audio signal content, and at 2,352 bytes per sector this results in a data rate of 176,400 bytes per second. The Red Book specifies that each audio data sample contains 2 bytes (16 bits), and that two audio channels are simultaneously encoded for stereo. Thus, each channel has an audio data rate of 44,100 samples per second, corresponding to an upper frequency of 22 kHz according to the well-known Nyquist criterion. The 16-bit resolution provides a dynamic range in excess of 90 dB, from −32,768 to +32,767.

The second kind of compact disc is termed the "compact disc read-only memory" (CD-ROM), which herein denotes any compact disc oh which arbitrary digital data may be recorded. The data on a CD-ROM may represent audio information, but it may also represent images, video, graphics, text, executable computer programs and data therefor, as well as any other information which may be represented digitally. The CD-ROM is specified by ISO/IEC International Standard 10149 "Data Interchange on Read-Only 120 mm Optical Data Disks", which is substantially the same as the original standard proprietary to Sony Corporation of Japan and Philips Electronics of the Netherlands. This standard is commonly known in the art, and denoted herein, as the "Yellow Book", and is incorporated by reference for all purposes as if fully set forth herein. The Yellow Book standard is based upon the physical and fundamental data format specifications of the Red Book, and contains specifications for additional data formatting, sector addressing, mode specification, byte scrambling, an additional two levels of Reed-Solomon Product Code (RSPC) error-correction, error-detection encoding, and byte swapping. More detailed information pertaining to the CD-ROM as well as to compact discs in general is available in popular publications, such as *The Compact Disc Handbook* by Ken C. Pohlman, published by A-R Editions, Inc., ISBN 0-895-79-300-8.

(Although the present invention pertains only to audio compact discs as specified by the Red Book, some details of the Yellow Book are herein presented so that the limitations of the prior art as well as the functioning of the copy-protection afforded by the present invention may be better appreciated. It is not necessary, however, to take into consideration any details specific to the Yellow Book in order to carry out the method according to the present invention or to produce an audio compact disc with copy-protection according to the present invention.)

There are a number of formatting variations covered by the Yellow Book, and there are derivative formats covered by related standards. A conceptual view of the Yellow Book recording process and format is illustrated in general in FIG. 3, to which reference is now briefly made. In summary, Yellow Book recording from a computer 305 starts with an arbitrary record data block 310 containing from 2,048 bytes to 2,324 bytes of any kind of binary data. The presence or absence of the optional features indicated in FIG. 3 depend on the specific mode in use, so that the actual number of bytes available for data varies according to the mode. Record data block 305 is given an optional additional error-correction 315, a byte scrambling 320, and a byte swapping 325, and is then formatted into a Yellow Book record sector 330 containing a total of 2,352 bytes, including the original data from record data block 310 and additional data such as header, a sector address 330-2, mode, and other optional information. The particular format of Yellow Book record sector 330 also depends on the details of the specific mode in use. Finally, Yellow Book record sector 330 is treated as a Red Book record data block, which is then recorded onto compact disc according to the Red Book standard. Playback of the recorded Yellow Book CD-ROM is illustrated in FIG. 4, and is essentially the reverse of the recording process shown in FIG. 3. A CD-ROM drive 400 reads a CD-ROM 440 via a laser reader 445 whose position relative to CD-ROM 440 is set by a sector selector 450 which receives an input from a computer 435. A Red Book playback data block 405 is output from laser reader 445 and treated as a Yellow Book playback sector 410, which undergoes a byte de-swapping 415, a byte descrambling 420, and an optional error-correction 425 to yield the arbitrary binary data of playback data block 430 for computer 435. At the same time, sector address decoding 455 provides a reference input to sector selector 450.

Recording an Audio Compact Disc

FIG. 1 illustrates the basic prior-art recording process for an audio compact disc. An audio sampling source 105 generates pairs of 16-bit samples of a two-channel (stereo) audio signal at a rate of 44,100 samples per second. These create a record data block 110 containing 2,352 bytes of data every 1/75 second, which are then encoded by an EFM encoding 115 as specified in the Red Book and as is well-known in the art. The bytes then undergo a crossing and cross-delay 120 followed by a computation 125 of a C2 error-correction codeword. This is followed by a C2 interleaving delay 130 and a computation 135 of a C1 error-correction codeword with a C1 interleaving delay. Details of crossing and cross-delay 120, C1 codeword and C1 interleaving delay, and C2 codeword and C2 interleaving delay, as well as the contents of a C1 codeword and C2 codeword are specified in the Red Book and are illustrated in FIG. 11 and FIG. 12. The purpose of the interleaving delays is to spread out the data content of the codewords over a relatively large physical area, and thereby prevent localized damage to the compact disc from corrupting more than a small portion of a codeword. A small amount of damage to a large number of codewords is correctable, but a large amount of damage to a small number of codewords is not. At the same time, A control and display encoding and synchronization pattern is generated in a computation 160, and combined with the interleaved codewords by a multiplexer 180. The result of the foregoing operations is the construction of a frame 140 containing a set of 33 EFM symbols, a typical symbol of which is indicated as a symbol 145. The 33 EFM symbols include a control symbol 140-2, a first set of 12 data symbols 1404, a set of four Q-parity symbols 140-6, a second set of 12 data symbols 140-8, and a set of four P-parity symbols 140-10. Note that frame 140 contains a total of 24 data symbols. Note that Q-parity symbols 140-6 are also denoted herein as C2 parity symbols and that P-parity symbols 140-10 are also denoted herein as C1 parity symbols.

The principal data storage unit is a sector 150, which contains a set 1504 of 98 consecutive and contiguous frames preceded by a synchronization header 150-2. Each sector contains 2,352 bytes of data corresponding to the 98 frames 1504 of 24 data bytes each. For every second of audio signal, 75 sectors are recorded onto an audio compact disc 155 (or a master) by a laser recorder 175 which is controlled by a linear tracking signal 170.

Error-Correction

The prior-art error-correction method utilized according to the Red Book standard consists of two levels of Reed-Solomon error-correction, which is well-known in the art. Each level of Reed-Solomon error-correction is based on a codeword containing a set of parity symbols in addition to a set of data symbols. The first codeword computed during the Red Book recording process, as illustrated in FIG. 1 is the C2 codeword, which contains 4 C2 parity symbols 140-6 in addition to 24 data symbols 140-4 and 140-8, for a total of 28 symbols. The second codeword computed during the Red Book recording process, as also illustrated in FIG. 1, is the C1 codeword, which contains 4 C1 parity symbols 140-10 in addition to the 28 symbols of the previously-computed C2 codeword, for a total of 32 symbols. Control symbol 140-2 is not part of any codeword and therefore is not protected by any error-correction.

Parity symbols represent redundancy within the codeword, and allow a certain amount of error to be corrected. As is well-known in the art, it requires 2 redundant symbols to correct a single arbitrary erroneous symbol (one whose position in the codeword is not known in advance). The use of the 2 redundant symbols allows computing the position of the arbitrary erroneous symbol and the magnitude of the error, and thereby allows that arbitrary erroneous symbol to be corrected (an arbitrary error in a parity symbol itself is also correctable). An erroneous symbol whose position is known in advance is termed an "erasure", and requires only a single redundant symbol for correction, because the location of such a symbol is known and only the magnitude of the error needs to be computed. A measure of the total error of a codeword is therefore given by the number of erasures plus 2 times the number of arbitrary erroneous symbols. A Reed-Solomon codeword having 4 parity symbols therefore has a limit of correcting measure of 4. Thus, a C1 or C2 codeword according to the Red Book can be corrected for up to 4 erasures, or up to 2 arbitrary erroneous symbols, or 1 arbitrary erroneous symbol and up to 2 erasures. Any error condition in excess of these limits results in an uncorrectable error. For example, 3 arbitrary erroneous symbols, or 5 erasures, or 1 arbitrary erroneous symbol and 3 erasures, or 2 arbitrary erroneous symbols and 2 erasures are all examples of uncorrectable errors in C1 and C2 codewords.

Compact Disc Players and Drives

The term "audio player" herein denotes any device for playing back the audible sounds recorded on an audio compact disc. Audio players include, but are not limited to, components for home entertainment systems, portable personal listening devices, entertainment systems for vehicles, and so forth. Audio players are often equipped with speakers or headphones so that they may be used as stand-alone devices for directly reproducing the sounds recorded on an audio compact disc without the need for any other equipment.

FIG. 2 illustrates the basic prior art arrangement for playback of audio compact disc 155 in an audio player 200. The playback process is essentially the reverse of the recording process illustrated in FIG. 1, with some important additions in connection with error-concealment. Audio player 200 reads audio compact disc 155 via a laser reader 270 whose positioning relative to the data on audio compact disc 155 is controlled according to a track selection 265, which receives input from a sound system 250. The audio data samples output from laser reader 270 are read as sectors, such as sector 150, which is then interpreted as a sequence of frames, such as frame 140. Information contained in frame 140 is separated by a multiplexer 255 into a main data channel stream that progresses to C1 codeword processing in a step 205, and a subcode channel that progresses to control and display processing in a step 260. Audio player 200 reads 75 sectors per second in accordance with the original audio signal sampling. During playback, the C1 codeword is examined first in step 205 to detect isolated errors and apply correction. As is known in the art, C1 decoders are usually set to correct at most a single arbitrary erroneous symbol and therefore are able to detect error conditions in excess of this limit accurately, and to pass along error-detection information to the C2 decoder from step 205 to a step 220. The C2 codeword is prepared by a C2 interleave advance 210. At the C2 codeword decoding stage in step 220, a detected error within the error-correction limits, as described above, results in the correction of the errors. However, a detected error in excess of the error-correction limits, as described above, results in the generation of what is termed in the art as an "E32 error" by an E32 error detector 240. An E32 error signifies that an uncorrectable error has been detected.

If no errors are detected or if all detected errors can be corrected, the audio signal is reassembled by a cross advance/decrossing 225 and an EFM decoding 230. The reassembled audio signal data is then presented in playback data block 235 for reproduction as an audio signal in sound system 250. If, however, uncorrectable errors are detected by E32 error detector 240, an error-concealment unit 245 hides the uncorrectable errors by performing an interpolative error-concealment, as is illustrated in FIG. 10, and as is discussed below. Through this means, the vast majority of errors present on audio compact disc 155 are either corrected or concealed, with the result that the reproduced audio signal usually appears to be error-free to the listener. The term "CD-ROM drive" herein denotes any device which is able to read the arbitrary digital data recorded on a CD-ROM. CD-ROM drives are not used as stand-alone devices by themselves, but rather as components within a computer system, which make the data recorded on a CD-ROM available to the computer system. Typically, a CD-ROM drive is also able to read the audio signal data recorded onto a Red Book audio compact disc. The basic prior art arrangement for accessing the data of a compact disc 510 via a CD-ROM drive 505 for a computer is illustrated in FIG. 5. Note that compact disc 510 can be an audio compact disc or a CD-ROM. First, compact disc 510 is read by laser reader 445, whose position relative to compact disc 510 is controlled by a positioning unit 570, which receives an input from a computer data bus 530. Data from laser reader 445 is input to a Red Book decoder 515, which obtains a Red Book playback data block 405 (FIG. 4), which is passed to a Yellow Book decoder 520. If Red Book playback data block 405 corresponds to a Yellow Book playback sector 410 (FIG. 4) then Yellow Book playback sector 410 is processed to extract a playback data block 430 (FIG. 4) which is presented as computer data interface input 525 to a computer data bus 530. If, however, Red Book playback data block 405 does not correspond to a Yellow Book playback sector, then Yellow Book decoder 520 may optionally ignore Red Book playback data block 405, or may optionally pass Red Book playback data block 405 without Yellow Book processing as computer data interface input 525 to computer data bus 530. In this latter case, computer data interface input 525 corresponds to audio signal data. Furthermore, if Red Book playback data block 405 does not correspond to a Yellow Book playback sector, then Red Book decoder 515 sends the audio output 535 corresponding to Red Book playback data block 405 to an error-concealment unit 580 for output to a sound reproduction device 545. As with the playback of an audio compact disc by an audio player as discussed above. error-concealment unit 580 prevents the output of uncorrectable errors. Note that positioning unit 570 receives reference input from both Red Book decoder 515 and Yellow Book decoder 520. If compact disc 510 is an audio compact disc, then the reference input to positioning unit 570 will be control and display information 550 from Red Book decoder 515. If, however, compact disc 510 is a CD-ROM, then the reference input to positioning unit 570 will also include Yellow Book sector address information 560, as illustrated in Yellow Book playback sector 410 (FIG. 4) It is important to emphasize that if compact disc 510 is an audio compact disc, only control and display information 550 from Red Book decoder 515 will be available as reference input to positioning unit 570.

It is important to note that neither the Red Book nor the Yellow Book, nor any other official standards for the compact disc specify any standards governing the design, operation, or performance of audio players or CD-ROM drives. The published standards are concerned only with the compact disc media itself and not with any devices used to make compact disc recordings or to play back material recorded on compact disc. There is therefore some variation in the performance, data handling, and error-correction capabilities of various audio players and CD-ROM drives. It is expected, however, that any commercially-available audio player, CD-ROM drive, or CD recorder will be able to play and/or record compact discs according to the published standards. In addition, the competitive nature of the market dictates that certain public expectations regarding the performance of such devices will be normally met. Thus, there are various principles and criteria for audio players and CD-ROM drives which are generally accepted and applied throughout the industry. These principles and criteria are discussed in various publications such as the previously cited books by Ken C. Pohlman. Such performance criteria include the ability of audio players to perform error-concealment during playback.

As noted above, because the CD-ROM Yellow Book standard is based on the audio compact disc Red Book standard, CD-ROM drives are also generally able to play audio compact discs. It is important to emphasize, however, that in the majority of commercially-available CD-ROM drives, the output of audio data from an audio compact disc is done through audio output 535, which is separate from computer data interface input 525 that makes the data accessible for computer use on computer data bus 530, as shown in FIG. 5. This separation of the audio and data channels is necessary because arbitrary data recorded on a CD-ROM must undergo the additional processing of Yellow Book decoder 520 in order to be available for computer use. As will be detailed subsequently, a result of this separation of audio and data channels is that for most commercially-available CD-ROM drives, computer data interface input 525 available for computer use does not necessarily undergo exactly the same processing as the audio output 535 which may be played by the CD-ROM drive. In particular, for most commercially-available CD-ROM drives, computer data interface input 525 for computer use on computer data bus 530 does not undergo error-concealment processing in error-concealment unit 540, and, as discussed in detail below, this is a fact that can be exploited to impart copy-protection to an audio compact disc according to the present invention.

Compact Disc Production Methods

There are two general methods utilized for producing compact discs. These methods apply equally to both audio compact discs and CD-ROM's. One method is well-suited to large-scale production, whereas the other method is better-suited to small-scale production.

The large-scale production method for compact discs involves molding the finished disc in a mold created from a master. Compact discs produced by this first method are herein termed "stamped discs". The production of stamped discs is characterized by a high setup cost, with a low unit cost and high output rate. Virtually all commercially-available compact discs are stamped discs.

The low-scale production method for compact discs involves recording each disc individually in a device denoted herein as a "CD recorder" using special recordable compact disc media. Compact discs produced by this second method are herein termed "recorded discs". The production of recorded discs is characterized by a negligible setup cost, with a relatively high unit cost and a very low output rate. Virtually all compact discs produced by individuals and other end-users are recorded discs.

Unauthorized Copying of Compact Discs

Because the data recorded on compact disc is in a digital format with an error-correction capability, it is possible to make faithful copies whose playback is indistinguishable from that of the original disc from which the copy was made. Moreover, a digital copy made from such a digital copy is also generally indistinguishable from the original, in contrast to analog recording, where repeated copying results in a gradual, but discernable, deterioration of the original quality.

Furthermore, because of the widespread commercial success of the compact disc and the standardization of the media, equipment for producing compact discs is readily-available and relatively inexpensive, both for stamped discs and for recorded discs. As a result, many organizations as well as individuals are capable of making copies of compact discs, and the unauthorized or illegal copying of compact discs has thus become a serious problem. Means for combating the unauthorized copying of compact discs include legal action to enforce copyright laws as well as technological methods to render it difficult or impossible to make an unauthorized copy of a compact disc. Such technological methods fall under the general category of "copy-protection" methods, which is a term used herein for describing any methods which allow an original recording to be utilized, but which prevent unauthorized copies of the original from being made, or which render such unauthorized copies substantially unusable. The process of applying copy-protection is herein denoted by the term "copy-protecting", and any original medium so processed is herein denoted by the term "copy-protected".

Unauthorized copying of compact discs by mass-producing stamped disc copies is done by well-funded organizations that are skilled in the technology of compact discs. The resulting unauthorized copies can thus be made to look identical to the original, and can therefore be sold for profit into the legitimate market and purchased by unsuspecting distributors and consumers. Although the organizations responsible for manufacturing such unauthorized copies may have a visible public profile because of the facilities and staff required for their operations, they are usually located where legal enforcement of copyright laws is lax. Copy-protection measures for thwarting unauthorized copying of stamped discs is hampered by the fact that these organizations are technologically sophisticated and are usually capable of disabling copy-protection. The most effective way to combat such mass-produced unauthorized copying is through expanded enforcement of the copyright laws, and this is the route that is currently being taken by the recording and publishing industries.

Unauthorized copying of compact discs by individually-producing recorded discs, however, is being done with increasing frequency by ordinary consumers who have purchased inexpensive computer systems and CD recorders. Such systems and the copying software for reproducing compact discs are easily obtained and operated. The resulting unauthorized copies are readily distinguishable visually from the original, and therefore cannot be sold in the marketplace for a profit as can the unauthorized stamped discs described above. These unauthorized recorded disc copies, however, are informally distributed for personal use by social contact, and displace the sale of legitimate compact discs. As computer systems and CD recorders continue to decline in price and increase in numbers throughout society, unauthorized copying of compact discs by individually-producing recorded discs is becoming a more and more serious problem. Because this unauthorized copying can be done by ordinary consumers working unassisted in complete privacy, it is impossible to control by means of law enforcement. Only suitable copy-protection methods can succeed in reducing the increasing flood of these unauthorized recorded disc copies. Unfortunately, as detailed below, the existing prior art copy-protection methods are unsuitable and/or inadequately effective for the audio compact disc.

Copying a Compact Disc

FIG. 6 illustrates a general method of copying original compact disc 510 using a small computer system equipped with CD-ROM drive 505 and a CD recorder 600. This method generally applies whether original compact disc 510 is an audio compact disc or a CD-ROM. CD-ROM drive 505 reads the data content of compact disc 510 and places computer data interface input 525 onto computer data bus 530. Through the use of copying software 605 the data of original compact disc 510 appears as computer data interface output 610 to a Yellow Book encoder 620, which is part of CD recorder 600. If computer data interface output 610 corresponds to Yellow Book data (where original compact disc 510 is a CD-ROM), then Yellow Book encoder 620 processes computer data interface output 610 and then passes Yellow Book-encoded data to a Red Book encoder 625 for recording onto compact disc copy 630, according to the recording method for a CD-ROM as illustrated in FIG. 3 (as before, there is a laser recorder 635 whose position is controlled by a linear tracking 640). Otherwise, if computer data interface output 610 corresponds to Red Book data (where original compact disc 510 is an audio compact disc), then Yellow Book encoder 620 does not process computer data interface output 610, but simply passes the audio signal data to Red Book encoder 625 for recording onto compact disc copy 630, according to the recording method for an audio compact disc as illustrated in FIG. 1. In either case, compact disc 630 is a copy of original compact disc 510. Note that copying software 605 sends positioning information to positioning unit 570 to control laser reader 410. As previously noted, if original compact disc 510 is a CD-ROM, then positioning unit 570 receives reference input both from Yellow Book decoder 520 (in the form of sector address information 560) and Red Book decoder 515 (in the form of control and display information 550), but if original compact disc 510 is an audio compact disc, then positioning unit 570 receives reference input only from Red Book decoder 515 (in the form of control and display information 550). The proper positioning is necessary to assure that copying software 605 receives the necessary data during the copying process.

Prior Art Copy-Protection Schemes

There are a number of existing copy-protection schemes specifically for CD-ROM's, which fall into several classes, most of which rely on the fact that the protected CD-ROM must be used with a computer. A first class of CD-ROM copy-protection scheme involves recording special computer software on the protected CD-ROM in conjunction with the placement of special marks on the original CD-ROM, such that these marks can be read by an ordinary CD-ROM drive, but such that these marks cannot be duplicated by an ordinary CD recorder. The special software recorded on the protected CD-ROM is necessary for utilizing the data or other information also recorded thereon, and also checks for the presence of the special marks. If the special marks can be read, the software considers the compact disc to be an original, and allows access to the data and information recorded thereon. Otherwise, if the special marks cannot be read, the software considers the compact disc to be an unauthorized copy, and does not allow access to the data and information recorded thereon. An example of such a copy-protection scheme is disclosed in U.S. Pat. No. 5,809,006 to Davis et al. (herein referred to as "Davis"), which records special marks on a compact disc in the form of a radial track wobble or channel clock rate variations. A second class of CD-ROM copy-protection scheme involves encrypting the data recorded on the CD-ROM, and providing the decryption key in a manner that is independent of the copied data. Schemes of this second class can be combined with those of the first class by encoding the decryption key within the special, non-copyable marks or alternative physical characteristics of the compact disc. Examples of this are disclosed in U.S. Pat. No. 5,923,754 to Angelo, et al. (herein referred to as "Angelo"), and in U.S. Pat. No. 5,915,018 to Aucsmith (herein referred to as "Aucsmith"). Because all of these schemes require the involvement of a computer or other programmable device to determine whether access to the recorded information is permitted, none of them is suitable for providing copy-protection to an audio compact disc that is to be played by an ordinary compact disc audio player. A third class of CD-ROM copy-protection scheme relies on modifying the data format of the protected CD-ROM, in such a way that recording devices and/or recordable compact disc media cannot accommodate the modified format. An example of such a scheme is disclosed in U.S. Pat. No. 5,832,088 to Nakajima et al. (herein referred to as "Nakajima"), which utilizes an abnormally-long data length that exceeds the capacity of the recordable compact disc media while relocating retrieval data so that it normally will not be copied. Such schemes also cannot be used for copy-protection of audio data because the principles upon which they rely are specific to data access, and are not applicable to audio playback.

There are furthermore various copy-protection schemes which are specific to other kinds of digital optical media. Examples of this are disclosed in U.S. Pat. Nos. 5,699,434 and 5,828,754 both to Hogan as well as the Angelo and Aucsmith patents previously cited, all of which pertain specifically to the unique digital encoding and formatting scheme of the Digital Video Disk (DVD), and whose methods are not applicable to the audio compact disc, whose encoding and formatting does not have the properties required to use these methods.

There also are a number of existing copy-protection schemes specifically for compact discs that are used with special players or other special equipment. One class of copy-protection scheme of this sort involves making changes in the format of the data recorded on the compact disc, such that the compact disc cannot be read by an ordinary CD-ROM drive and therefore cannot be copied using such a device. Another class of such schemes does not directly prevent the making and using of unauthorized copies, but rather provides only a special method and device for differentiating between an original compact disc and an unauthorized copy. An example of this is disclosed in U.S. Pat. No. 5,696,757 to Ozaki et al. (herein referred to as "Ozaki"). Still another class of scheme involves a central database which is automatically contacted by the special player or special equipment in conjunction with each use of the material recorded on the protected compact disc. The central database maintains accounting information and bills the user for each use of the protected material. Use of the material is restricted by the special player or special equipment to that which is authorized by the central database. Strictly speaking, this is not a copy-protection method, but a usage-control system. Because these schemes require the use of special players or other special equipment, they are not suitable for providing copy-protection to an audio compact disc that is to be played by an ordinary compact disc audio player and which is vulnerable to being copied by ordinary computer equipment and CD recorders.

Another class of copy-protection scheme applies to recorded audio signals regardless of the medium. Schemes of this class involved masking the recorded audio signals with noise that is filtered out by special playback equipment. An example of such a scheme is disclosed in U.S. Pat. No. 5,394,274 to Kahn (herein referred to as "Kahn"), which discloses a device, to be incorporated into consumer equipment, which removes the superimposed noise for playback, but which restricts the copying thereof. Yet another class of copy-protection scheme requires the use of special playback/recording equipment that can be selectively unlocked to allow playback and selectively locked to prevent recording. An example of such a scheme is disclosed in U.S. Pat. No. 4,979,210 to Nagata et al. (herein referred to as "Nagata"), which places supplemental information on the protected audio recording and relies on a detector to detect this supplemental information and disable the copying device. Another example of such a scheme is disclosed in U.S. Pat. No. 5,083,224 to Hoogendoom et al. (herein referred to as "Hoogendoom"), which places a substantially inaudible copy-protection code in a low-frequency differential signal between the audio stereo channels, and which is detected by special playback/recording equipment to disable or distort the recording. Because all schemes of this sort rely on special playback and/or recording equipment, they are unsuitable for providing copy-protection to an audio compact disc that is to be played by an ordinary compact disc audio player and which is vulnerable to being copied by ordinary computer equipment and CD recorders.

A copy-protection method specific to compact disc which is applicable both to CD-ROM as well as audio compact discs is disclosed in U.S. Pat. No. 5,930,209 to Spitzenberger et al. (hereinafter referred to as "Spitzenberger"), and relies on placing irregularities in sector addresses to prevent unauthorized copying by interfering with the reference information input to positioning unit 570 (FIG. 6). Unfortunately, this method is not entirely successful in preventing unauthorized copying of audio compact discs, because many CD-ROM drives and types of copying software do not need to continuously control positioning unit 570 when copying audio data tracks, and thus irregularities in sector addresses as disclosed by Spitzenberger have no deterrent effect on such CD-ROM drives.

A recently-published announcement on the Internet by C-Dilla in England ("C-Dilla Announces AudioLok," Jul. 28, 1999) alleges that the error-correction codes for a Red Book audio compact disc are different from those of a Yellow Book CD-ROM, and that it is therefore possible to manipulate the error-correction codes of an audio compact disc to prevent the audio compact disc from being readable by a CD-ROM drive. This, however, is misleading, in that the error-correction codes specified for Red Book audio compact discs are absolutely identical to the principal error-correction codes specified for Yellow Book CD-ROM's, as is illustrated herein in FIG. 3 and FIG. 4. Methods of manipulating these error-correction codes to prevent a compact disc from being readable by a CD-ROM drive are known in the art, including methods as previously disclosed in U.S. patent application Ser. No. 09/032,905 dated Mar. 2, 1998, which is based on provisional application No. 60/038, 080 dated Mar. 6, 1997 to one of the present inventors. Moreover, it has been discovered that while manipulating the error-correction codes of an audio compact disc renders that audio compact disc partially unreadable by some CD-ROM drives, there are nevertheless many ordinary CD-ROM drives available on the consumer market which are capable of reading such an audio compact disc, sometimes through the use of special software commands. The method described in the above-cited published announcement by C-Dilla, therefore, does not represent as good a form of copy-protection as is possible to attain.

There is thus a widely recognized need for, and it would be highly advantageous to have, a means of copy-protecting a digital audio compact disc such that ordinary audio players may be utilized for playback of the original disc without relying on the use of any special equipment for playback, and which will enforce the copy protection when an attempt is made to copy the original disc by reading it using an ordinary CD-ROM drive with commercially-available compact disc recording equipment. This goal is met by the present invention.

SUMMARY OF THE INVENTION

The present invention relies upon the fact that the audio compact disc has been designed to reproduce sounds as accurately as possible in the face of error conditions, and in addition to having two levels of error-correction, is designed to facilitate the use of error-concealment during playback. The opportunity to use error-concealment is unique to the audio compact disc, and is not available for other optical disc media, such as the DVD, nor is it applicable to most data stored on a CD-ROM.

Errors can arise through physical damage to a compact disc such that an original data value of the audio signal is obscured or obliterated. The Red Book specifies storing two levels of additional redundant parity information with the audio signal for error-correction under such conditions. Normally, therefore, occasional errors can be corrected by the audio player utilizing this parity information in accordance with mathematical error-correction techniques that are well-known in the art and which are specified in the Red Book standard. It can happen, however, that a serious error can occur, which is beyond the mathematical ability of the error-correction codes to repair. Such an error is herein denoted by the term "uncorrectable error". With error-concealment, an audio player will hide the uncorrectable error by substituting an interpolated value for the audio data sample in place of the erroneous value. In most cases, the substituted interpolated value will closely approximate the correct value, because of the 44.1 kHz sampling rate. Thus, for all but the highest-frequency components contained in the original audio signal, the interpolated value will be audibly indistinguishable from the correct values. (This can be seen by considering the case where half of the audio data samples are replaced by interpolated values, which would be equivalent to sampling at half the 44.1 kHz frequency. The resulting upper audio frequency would be 11 kHz, which still encompasses most of the audible spectrum. An occasional application of error-concealment, therefore, will not audibly degrade the quality of the audio compact disc.) Consequently, the intentional insertion of an uncorrectable error generally is not audible, and moreover, in accordance with the preferred embodiment of the present invention, it is possible to select specific audio data samples for replacement by erroneous values in such a way that the error-concealments are definitely inaudible. (As noted previously, although the format of the audio compact disc was designed to facilitate error-concealment, and all currently-available audio players implement error-concealment, the process and implementation of error-concealment is not covered in the Red Book and is not part of the official specification of the audio compact disc.)

In a first step of the preferred embodiment of the present invention, erroneous symbols (that is, symbols having erroneous values) are deliberately recorded on the audio compact disc in place of certain correct values of the audio data samples, in such a way that upon playback, the erroneous values would normally reproduce an objectionable noise superimposed over the correct audio signal. The error-correction information recorded on the audio compact disc, however, would normally allow these erroneous values to be perfectly corrected during playback so that the original correct audio signal would be output. Therefore, in a second step of the preferred embodiment, the error-correction information which corresponds to the erroneous values is also overwritten with invalid values such that the audio player will be unable to perform the error-correction. Nevertheless, even though the errors are not correctable, the audio player detects the presence of these erroneous values and hides them by error-concealment, as described above. Thus, upon playback of an audio compact disc according to the present invention, the substituted erroneous values will be inaudible when played on an ordinary compact disc audio player.

If, however, an attempt is made to copy the compact disc using an ordinary computer system having a CD-ROM drive for playing the original compact disc, a CD recorder for recording a copy under control of copying software, in the majority of cases the CD-ROM drive will not apply error-concealment to the data read from the compact disc, but will either fail to read the erroneous values (because they are uncorrectable errors) or will simply read the erroneous values in the audio signal and send these erroneous values to the CD recorder for copying onto the recordable compact disc media. Thus, either substantial portions of the original compact disc will be uncopyable because of the uncorrectable errors, or the erroneous values of the original will be copied. In the former case, the copy will reproduce silence in place of substantial portions of the original audio signal, and in the latter case, the copy will reproduce objectionable noise in place of substantial portions of the original audio signal. In either of these cases, the copy will be rendered substantially unusable, whereas the original compact disc will faithfully reproduce the original audio signal when played in an ordinary CD audio player.

Thus, the method according to the present invention and the audio compact disc thereof implement copy-protection through the use of latent noise, which does not appear when the original audio compact disc is played on an ordinary compact disc audio player, but which is either manifest in unauthorized copies of the audio compact disc made on a computer system having an ordinary CD-ROM drive and an ordinary CD recorder, or which disrupts the recording of an unauthorized copy of the audio compact disc. That is, the latent noise does not interfere with the playback of the copy-protected audio compact disc on an ordinary audio player, but the latent noise does interfere with the unauthorized copying of the audio compact disc on an ordinary CD recorder and with the playback of unauthorized copies made on ordinary CD recorders.

To augment the protection provided by the latent noise method, where a CD-ROM drive employs error-concealment on audio signals read as data, the method of the present invention also selectively disables the control and display reference information to the laser reader positioning unit. This is accomplished by manipulating the subcode channel of the audio tracks.

This copy-protection is enforced by the limitations of the ordinary CD-ROM drive used to read the original compact disc, and does not depend on the use of special recording or playback equipment. Furthermore, such copy-protection according to the present invention cannot be disabled or evaded by the copying software.

Therefore, according to the present invention there is provided a method for producing a copy-protected audio compact disc containing a plurality of symbols within error-correction codewords representing audio data samples of an audio signal, by including latent noise on the copy-protected audio compact disc which does not interfere with the playback of the audio signal from the audio compact disc on an ordinary audio player, but which interferes with the unauthorized copying of the audio compact disc on an ordinary CD recorder and with the playback of an unauthorized copy of the audio compact disc made on an ordinary CD recorder, the method including the steps of: (a) selecting at least one audio data sample of the audio signal; (b) locating the data symbols representing the at least one audio data sample; (c) overwriting the data symbols with erroneous symbols; (d) locating the error-correction codewords which contain the data symbols; and (e) disabling the error-correction of the error-correction codewords.

Furthermore, according to the present invention there is provided a copy-protected audio compact disc containing a plurality of symbols representing audio data samples of an audio signal, and including latent noise which does not interfere with the playback of the audio signal from the audio compact disc on an ordinary audio player, but which interferes with the unauthorized copying of the audio compact disc on an ordinary CD recorder and with the playback of an unauthorized copy of the audio compact disc made on an ordinary CD recorder, the copy-protected audio compact disc including at least one erroneous symbol that does not correspond to the audio signal, and wherein the at least one erroneous symbol is contained within a disabled error-correction codeword.

Moreover, according to the present invention there is provided a system for producing a copy-protected audio compact disc containing a plurality of symbols within error-correction codewords representing audio data samples of an audio signal, for including latent noise on the copy-protected audio compact disc which does not interfere with the playback of the audio signal from the audio compact disc on an ordinary audio player, but which interferes with the unauthorized copying of the audio compact disc on an ordinary CD recorder and with the playback of an unauthorized copy of the audio compact disc made on an ordinary CD recorder, the system including: (a) an audio data source providing audio data samples to be recorded onto a copy-protected audio compact disc; (b) a Red Book encoder for encoding the audio data samples; (c) a noise generator for generating the latent noise; (d) a codeword disabling unit for disabling error-correction codewords; (e) a recording laser; (f) a laser controller for controlling the recording laser; (g) a switch for selecting between the output of the Red Book encoder and the output of the codeword disabling unit, and for passing the selected output to the laser controller.

BRIEF DESCRIPTION OF THE DRAWINGS

The invention is herein described, by way of example only, with reference to the accompanying drawings, wherein.

It is noted that certain identical elements are illustrated in more than one drawing, in which case such elements are labeled with the same identifying number wherever they appear.

DESCRIPTION OF THE PREFERRED EMBODIMENTS

The principles and operation of a copy-protected audio compact disc according to the present invention may be understood with reference to the drawings and the accompanying description.

Sampling and Reproducing an Audio Signal

Figure 7:
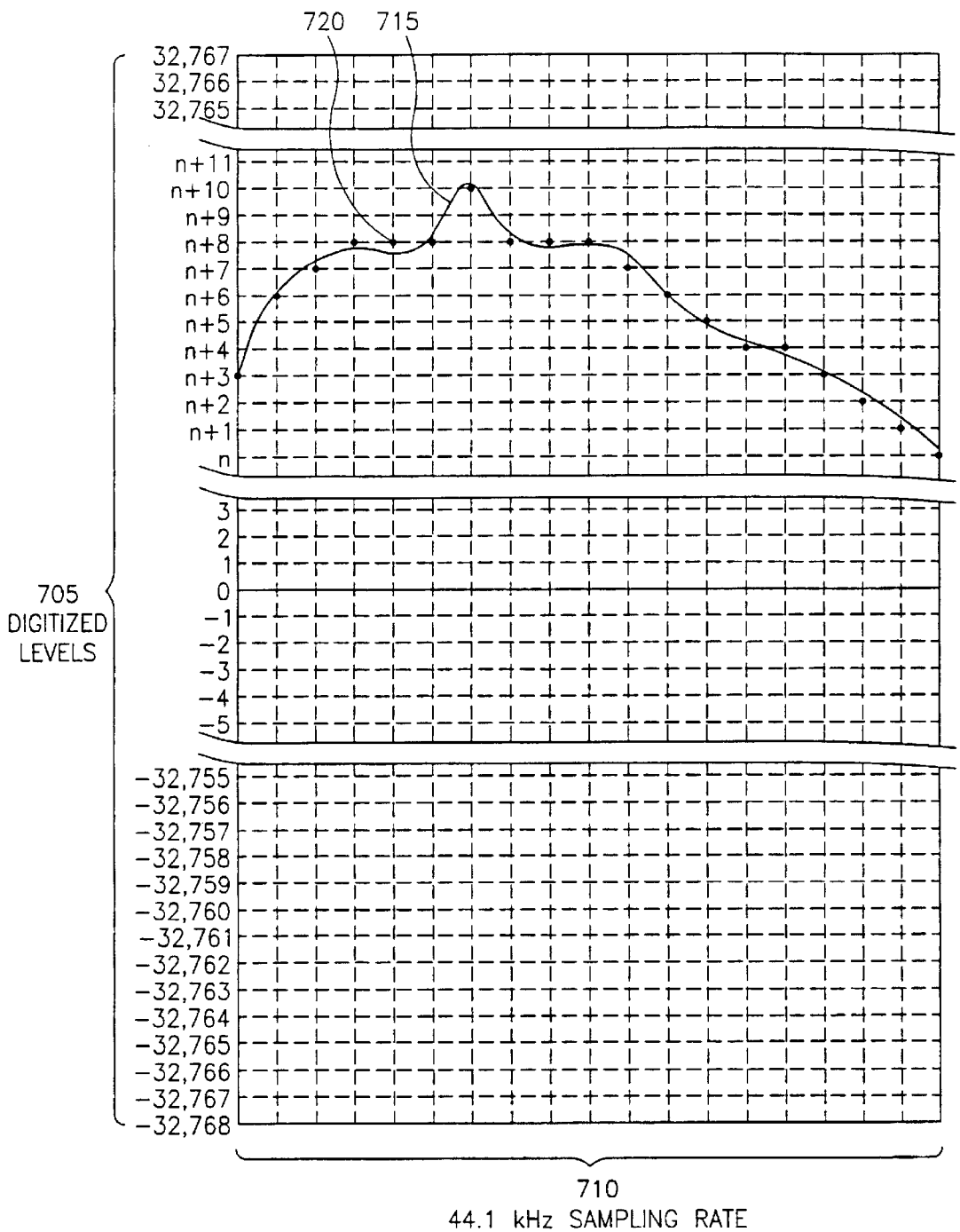
FIG. 7 illustrates the sampling of an audio signal.

FIG. 7 illustrates a prior-art sampling of an audio signal 715. The sampling is done in time intervals 710 of approximately 22.68 microseconds each, corresponding to a sampling rate of 44.1 kHz, with digitized levels 705 corresponding to 16-bit resolution in 2's complement arithmetic, from −32,768 to +32,767. A typical audio data sample 720 approximates the value of audio signal 715. An audio data sample is represented as two bytes, and a set of such audio data samples is contained in record data block 110 (FIG. 1) for recording onto an audio compact disc.

Figure 8:
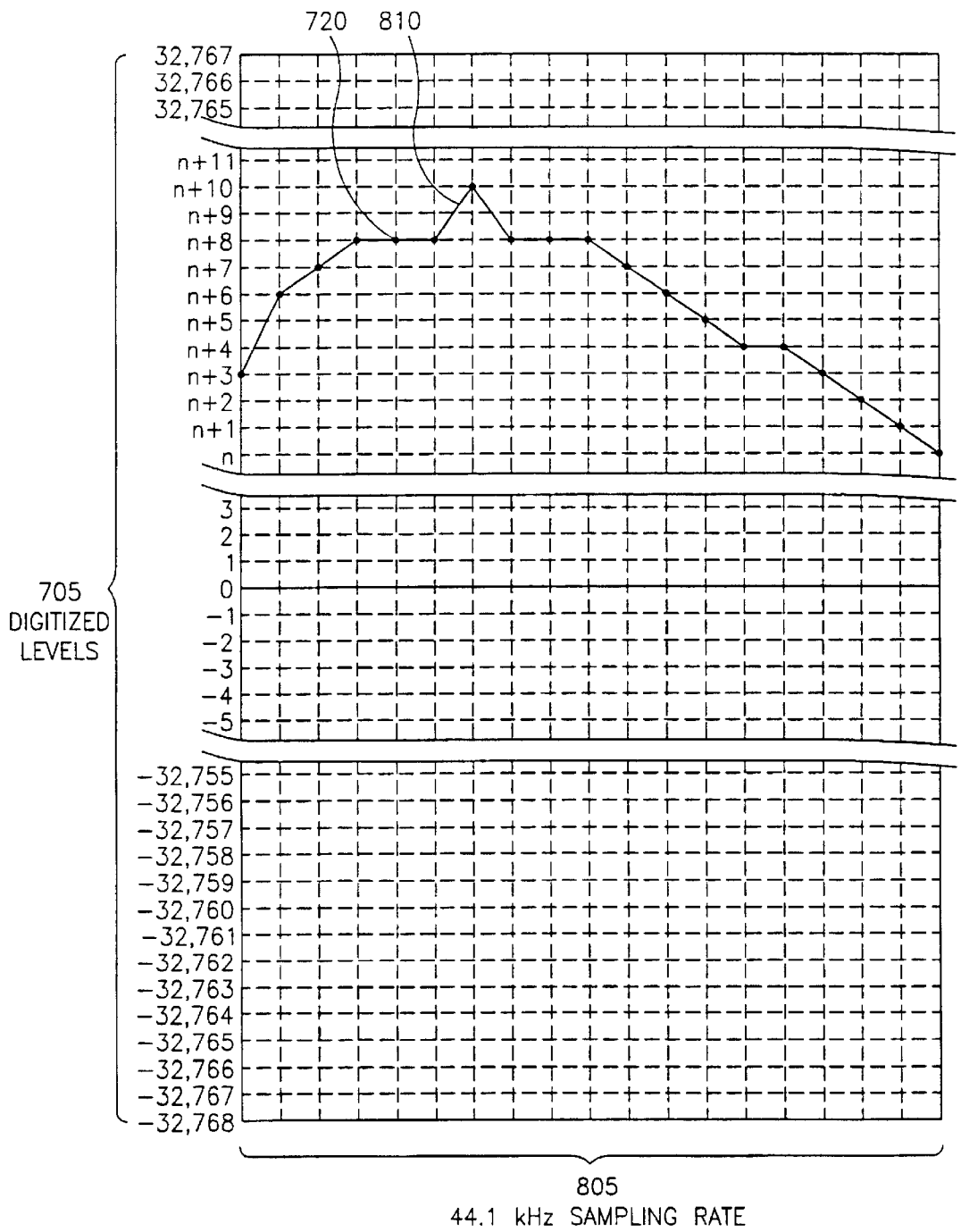
FIG. 8 illustrates the reconstruction of an audio signal from the sampling of the audio signal of FIG. 7.

FIG. 8 illustrates a prior-art audio signal reproduction 810 from a set of audio data samples, such as audio data sample 720, corresponding to audio signal 715 (FIG. 7). The reproduction is done in time intervals 805, which are also of approximately 22.68 microseconds each, corresponding to an output rate of 44.1 kHz, with the same digitized levels 705 as were originally used to perform the sampling (FIG. 7).

Overwriting an Error onto a Sampled Audio Signal

Figure 9:
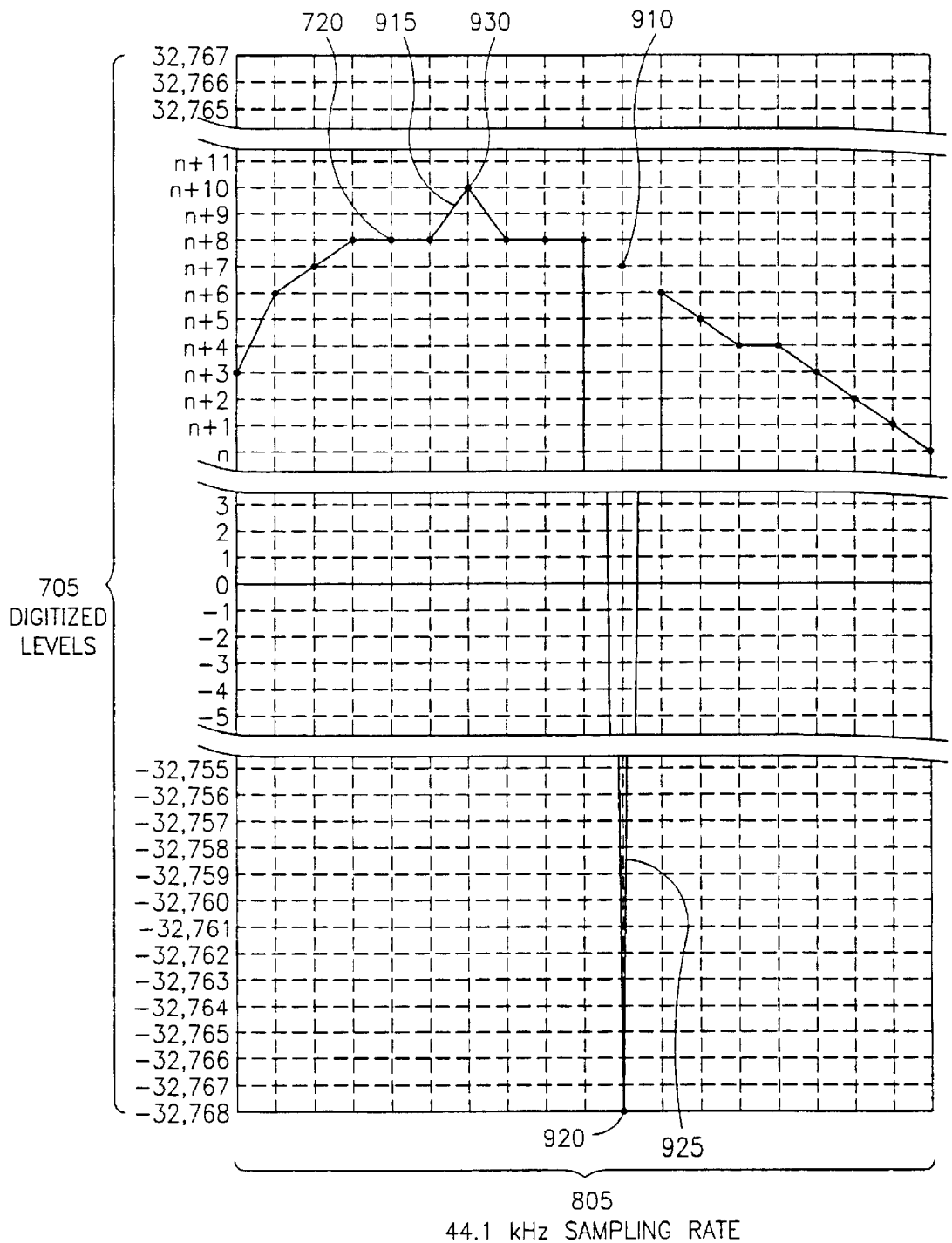
FIG. 9 illustrates the reconstruction of an audio signal from the sampling of the audio signal of FIG. 7 with overwritten latent noise according to the present invention.

FIG. 9 illustrates the replacement of a correct audio data sample 910 by an erroneous value 920 in the set of audio data samples originally corresponding to reproduced audio signal 810 (FIG. 8), resulting in an audio signal reproduction 915 having a superimposed impulse 925. As illustrated in FIG. 9, superimposed impulse 925 can be made very large by choosing erroneous value 920 to deviate from correct audio data sample 910 by a large value.

Figure 1:
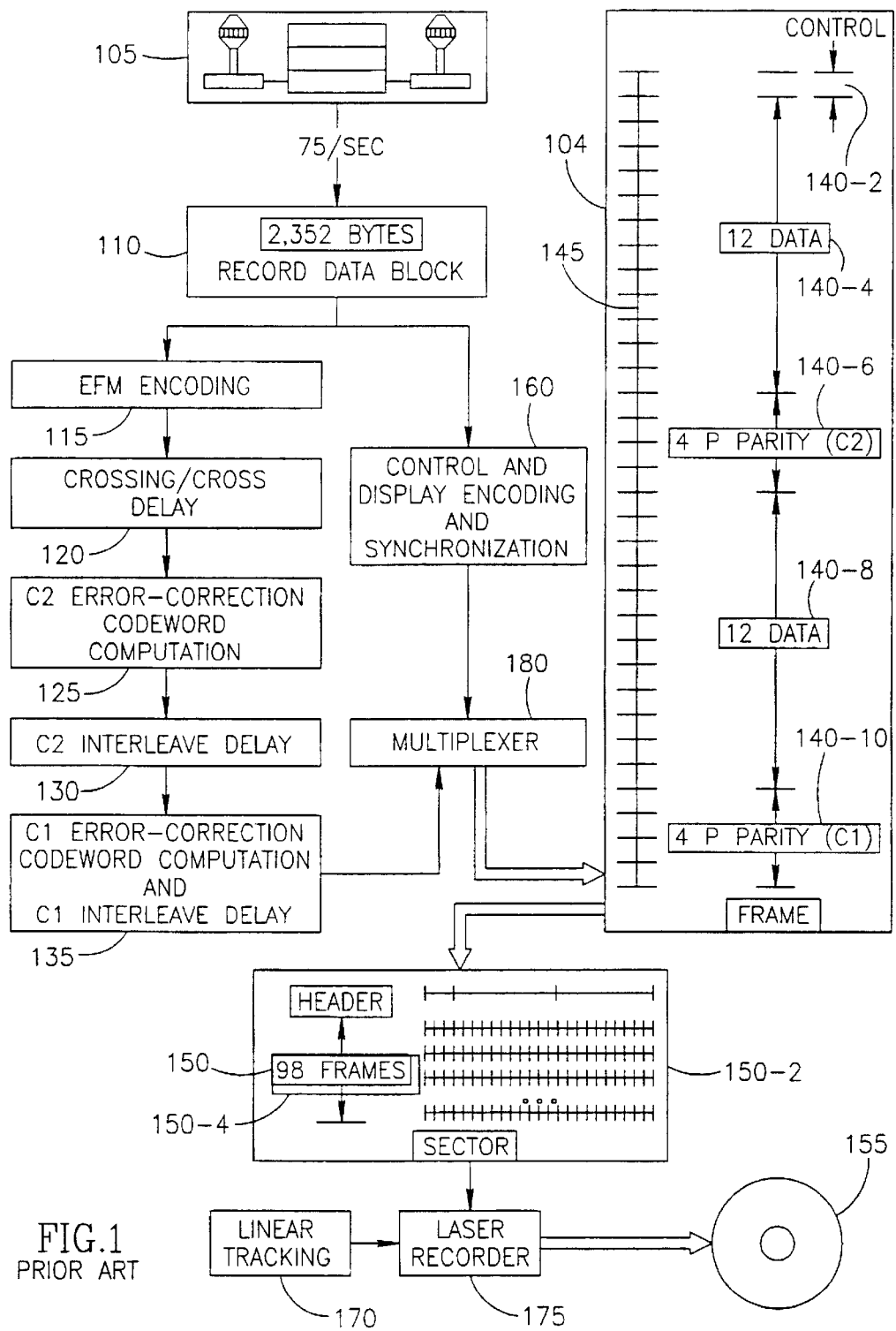
FIG. 1 illustrates the prior-art audio format and recording process for a compact disc according to the Red Book standard.

Referring again to FIG. 1, it is seen that there are various points in the recording process at which the replacement of correct audio data sample 910 by erroneous value 920 can be made. The earliest point where the replacement can be made is within record data block 110, prior to EFM encoding 115. If the replacement is made at this earliest point, then the subsequent EFM encoding 115 as well as the crossings, delays, and codeword computation (as illustrated in FIG. 1) will be made using erroneous value 920 as if erroneous value 920 were correct. Hence, if the replacement is made within record data block 110 and no other processing were done, the frame information to be recorded onto audio compact disc 155 would record and play back superimposed impulse 925. The latest point where the replacement can be made is within sector 150 prior to recording onto audio compact disc 155. If the replacement is made at this latest point, then the subsequent EFM encoding 115 as well as the crossings, delays, and codeword computation (as illustrated in FIG. 1) will have been made using correct audio data sample 910, and erroneous value 920 would not only be erroneous as far as correct audio data sample 910 is concerned, but would also be erroneous as far as the playback operation (FIG. 2) is concerned, and would be corrected. Hence, if the replacement is made within sector 150 and no other processing were done, the frame information to be recorded onto audio compact disc 155 would record superimposed impulse 925, but would play back correct audio signal 810 (FIG. 8) without superimposed impulse 925.

The present invention uses such a replacement to overwrite latent noise onto an audio compact disc, but the specific location where the replacement is made does not matter, because additional processing disables the error-correction. This not only prevents the correction of erroneous value 920, but causes error-concealment 245 (FIG. 2) to hide the error and hence the latent noise completely, as is discussed below. It is, however, most convenient to make the replacement at the earliest point, within record data block 110, because this eliminates the need to check and possibly correct inter-symbol merge bits 1315 (FIG. 13), as discussed below.

A superimposed impulse according to the present invention has a rich harmonic content and introduces a substantial amount of broad-spectrum noise into an audio signal.

Error Concealment of an Error in a Sampled Audio Signal

Figure 10:
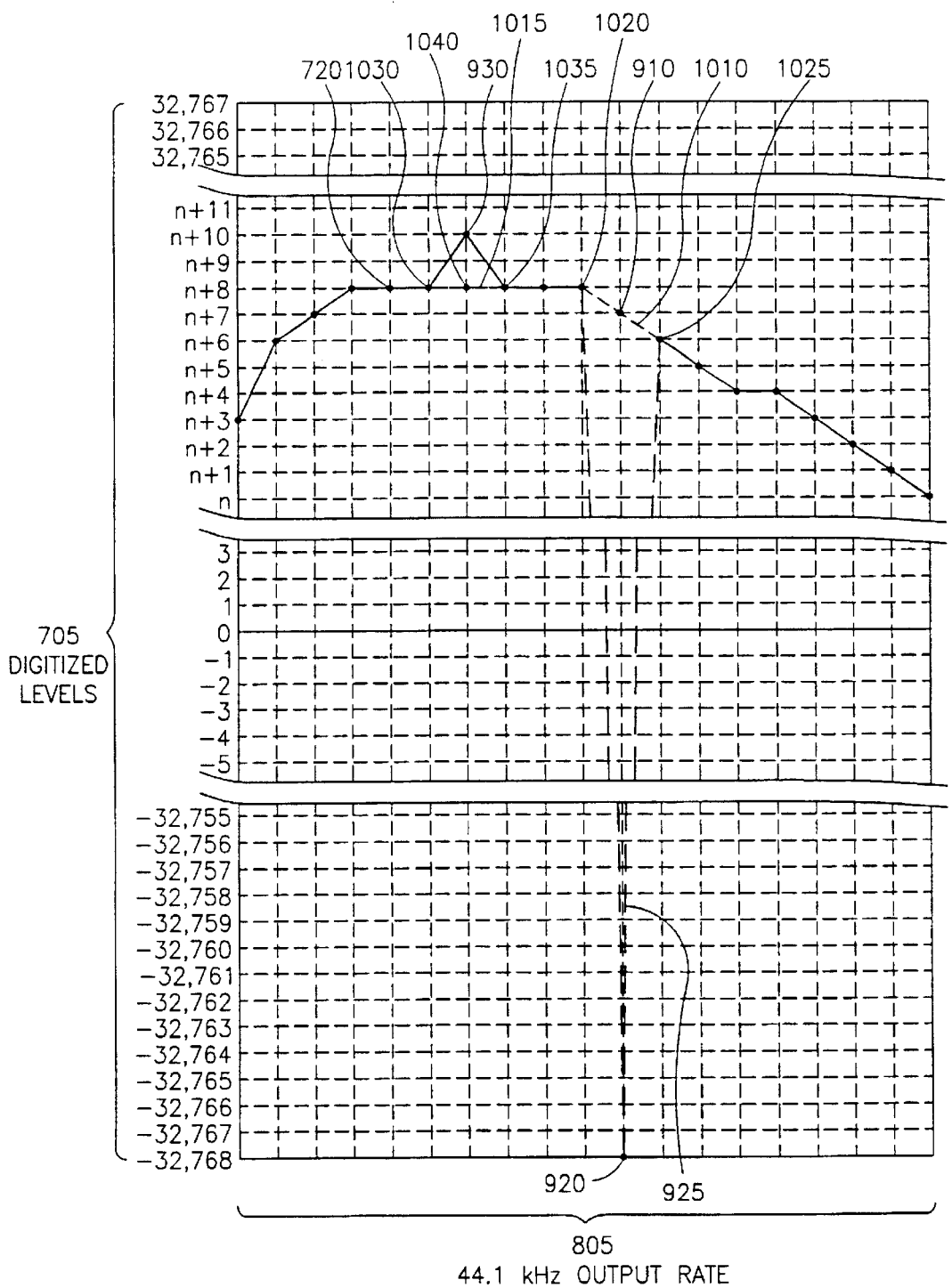
FIG. 10 illustrates error-concealment of overwritten latent noise in a sampling of the audio signal of FIG. 7.

FIG. 10 illustrates the prior-art error-concealment of erroneous value 920 and superimposed impulse 925 by interpolation. This process will occur in a typical audio player 200 (FIG. 2) if E32 error detector 240 receives an input signal from C2 error-correction 220 that erroneous value 920 represents an uncorrectable error. In such a case, error-concealment 245 interpolates the audio signal to hide erroneous value 920 and resulting superimposed impulse 925.

To apply prior-art error-concealment, the uncorrectable error, erroneous value 920 is ignored, and in place of erroneous value 920, a linear interpolation 1010 is computed between a prior correct audio data sample 1020 and a subsequent correct audio data sample 1025. Note that the audio data samples are available in advance of the output of the reproduced audio signal. so that subsequent correct audio data sample 1025 is available for use in interpolative error-concealment. As is known and appreciated in the art, one of the goals of the Red Book design strategy regarding the use of crossing and interleaving (as shown in FIG. 1) was to enable interpolative error-concealment.

In this particular instance, linear interpolation 1010 coincides with correct audio data sample 910 at the appropriate time interval of the sampling reproduction, and therefore the correct audio signal is reproduced as perfectly as the sampling permits. If, however, an erroneous value had been instead substituted for correct value 930, the interpolative error-concealment would not have reproduced precisely the correct original audio signal. In such a case, a prior correct audio data sample 1030 and a subsequent correct audio data sample 1035 would have been used to compute a linear approximation 1015, which would have reproduced an output sample 1040 in place of correct value 930. The difference in magnitude between output sample 1040 and correct value 930 is not great, however, and in general interpolative error-concealment does an excellent job of hiding uncorrectable errors. In a preferred embodiment of the present invention, though, overwritten latent noise is performed in locations where interpolative error-concealment reconstructs the correct audio signal perfectly, such as for the placement of erroneous value 920. That is, the correct audio data sample corresponds to a linear interpolation between the previous audio data sample and the subsequent audio data sample, and hence the error-concealment of the erroneous value is perfect. Such an audio data sample is herein denoted by the term "perfectly-concealable audio data sample".

Disabling Error-Correction

Figure 2:
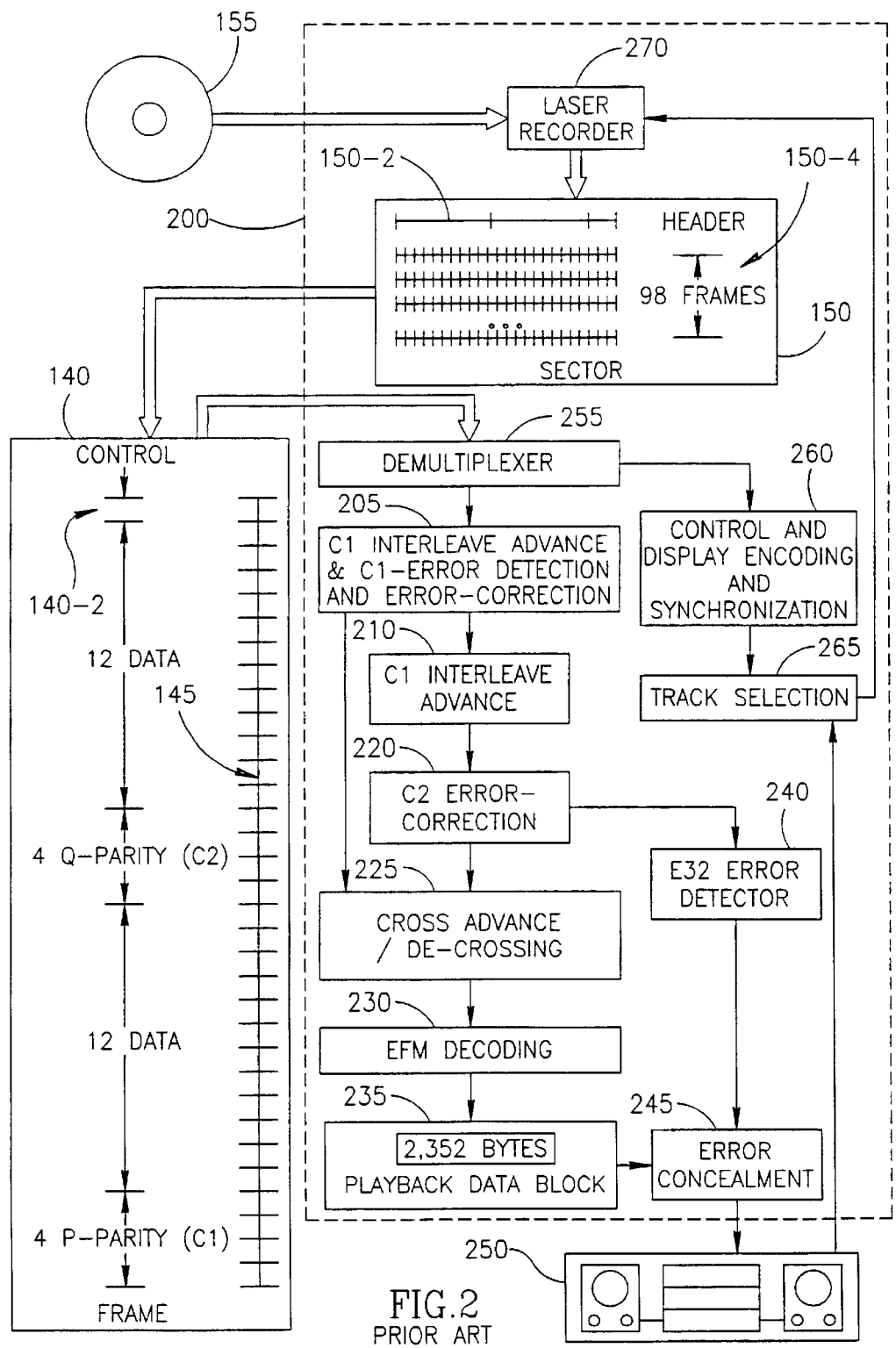
FIG. 2 illustrates the prior-art audio format and playback process for a compact disc according to the Red Book standard.
Figure 6:
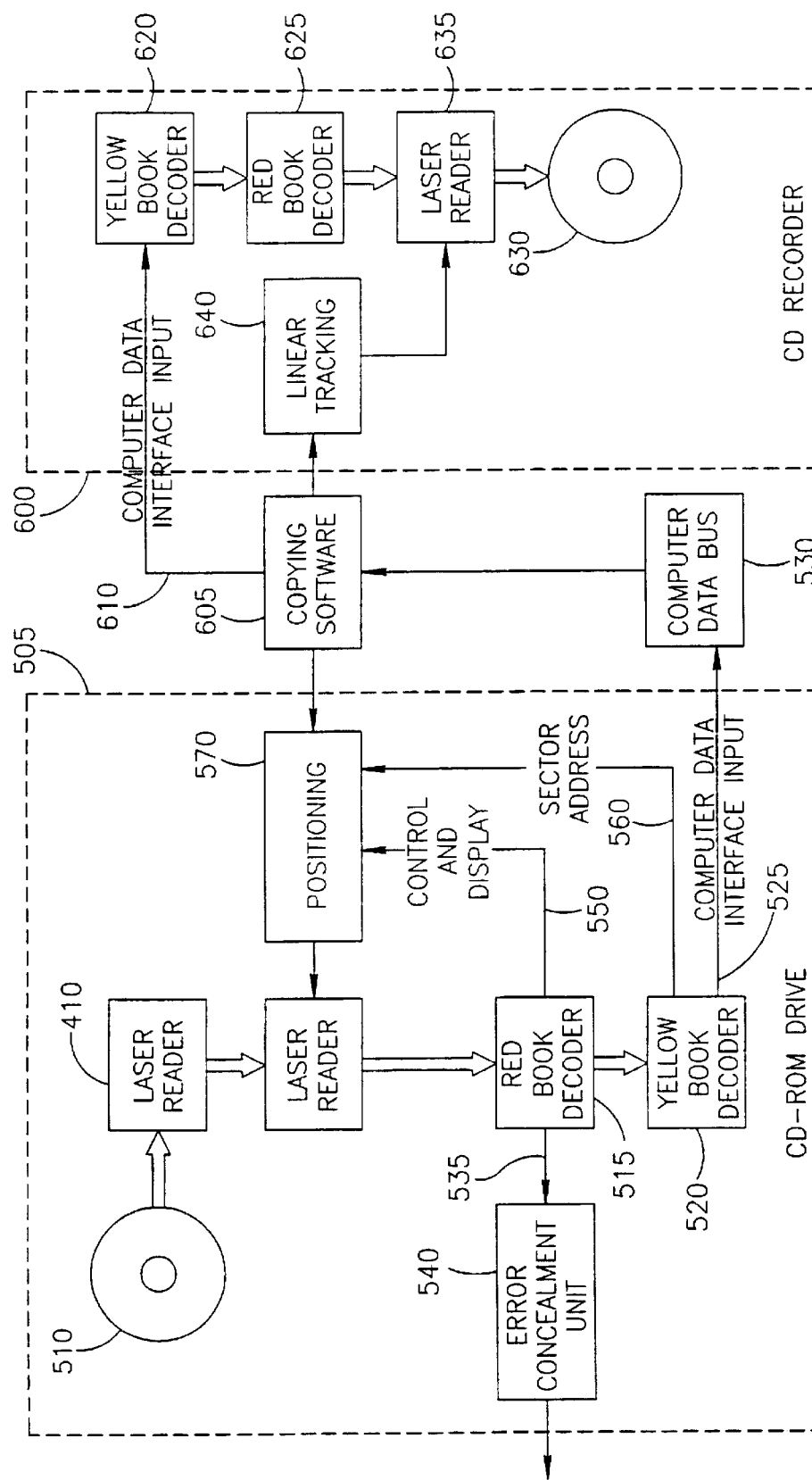
FIG. 6 is a block diagram conceptually illustrating the flow of information during the prior-art copying of a compact disc onto recordable compact disc media.

As illustrated in FIG. 2, FIG. 6, and FIG. 10, in order to activate error-concealment 245 for erroneous value 920 and thereby suppress the output of superimposed impulse 925 upon playback in audio player 200, it is necessary that erroneous value 920 be identified as an uncorrectable error by E32 error detector 240. Otherwise, depending on how erroneous value 920 was substituted for correct audio data sample 910 (as discussed previously), either erroneous value 920 will be corrected both for audio player 200 but also for CD-ROM drive 505 (FIG. 6) thereby allowing usable copies of original audio compact disc 510 to be made, or erroneous value 920 will be considered correct thereby causing the output of superimposed impulse 925 not only from CD-ROM drive 505 but also from audio player 200 thereby outputting objectionable noise when original audio compact disc 510 is played. If, however, erroneous value 920 is identified as an uncorrectable error on playback, then error-concealment will prevent the output of superimposed impulse 925 when original audio compact disc is played in an audio player, but for most CD-ROM drives either no audio signal will be readable or the read audio signal will have superimposed impulse 925 obscuring the correct audio signal. If a suitable number and selection of audio data samples on original audio compact disc 510 are overwritten with latent noise as described herein, this will render unauthorized copies of original audio compact disc 510 unusable, thereby implementing the desired copy-protection on the original audio compact disc.

Disabling of error-correction for erroneous value 920 may be accomplished by overwriting erroneous values and/or invalid symbols in place of a suitable number of correct symbols of the codewords in which the component data symbols of erroneous value 920 are contained. If more errors are created in this fashion than the Reed-Solomon error-correction can handle, the overwritten codewords will no longer support error-correction. In this way, erroneous value 920 will be identified as an uncorrectable error by E32 error detector 240. Although this may be accomplished by overwriting arbitrary symbols in the codewords. in a preferred embodiment of the present invention the overwritten symbols of the codewords are parity symbols of the codewords. This is because overwriting parity symbols has no direct effect on the audio signal content of the audio compact disc.

As previously discussed, a C1 or C2 codeword according to the Red Book can be corrected for up to 4 erasures, or up to 2 arbitrary erroneous symbols, or 1 arbitrary erroneous symbol and up to 2 erasures. Any error condition in excess of these limits results in an uncorrectable error. Therefore, to disable error-correction in any codeword, and thereby produce a disabled error-correction codeword for which Reed-Solomon error-correction cannot be performed, it is sufficient to overwrite the parity symbols in the codeword with any combination meeting or exceeding these limits. For example, if 3 parity symbols are overwritten with arbitrary erroneous symbols, this will exceed the error-correction capability of the codeword and all data values in that codeword will be considered as uncorrectable errors.

Overwriting a Symbol with an Erasure

Also as noted above, it is possible to disable error-correction within a codeword by overwriting a suitable number of parity symbols within the codeword with erasures. An erasure can be created by overwriting a symbol with an invalid symbol. An invalid symbol is any symbol that does not correspond to an 8-bit value as defined in the Red Book for EFM encoding. For some Red Book decoders, an erasure in a C2 codeword may also be made by creating an error in a corresponding C1 codeword, such that the C1 decoder reports to the C2 decoder that a specific symbol is erroneous. In either case, the appropriate decoder can determine that a particular symbol is erroneous without first applying error-correction on that codeword, because invalid symbols do not correspond to any 8-bit value and are therefore a priori erroneous.

In general, a preferred way of creating an erasure is by overwriting a symbol with an invalid symbol that obeys the Red Book RLL rules. There are 11 such invalid symbols, herein denoted as a series of 14 binary digits, where 1 represents a transition and 0 represents the absence of a transition:

0-0-1-0-0-0-0-0-0-0-0-0-0-1
0-0-0-0-0-0-0-0-0-1-0-0-1-0
0-0-0-0-0-0-0-0-0-0-1-0-0-0
0-0-0-0-0-0-0-0-0-0-1-0-0-1
0-0-0-0-0-0-0-0-1-0-0-0-0-0
0-0-0-0-0-0-0-0-1-0-0-0-0-1
0-0-0-0-1-0-0-0-0-0-0-0-0-0
0-0-0-1-0-0-0-0-0-0-0-0-0-0
0-1-0-0-1-0-0-0-0-0-0-0-0-0
1-0-0-0-1-0-0-0-0-0-0-0-0-0
1-0-0-1-0-0-0-0-0-0-0-0-0-0

The substitution of one of the above invalid symbols for a symbol will create an erasure.

Figure 17:
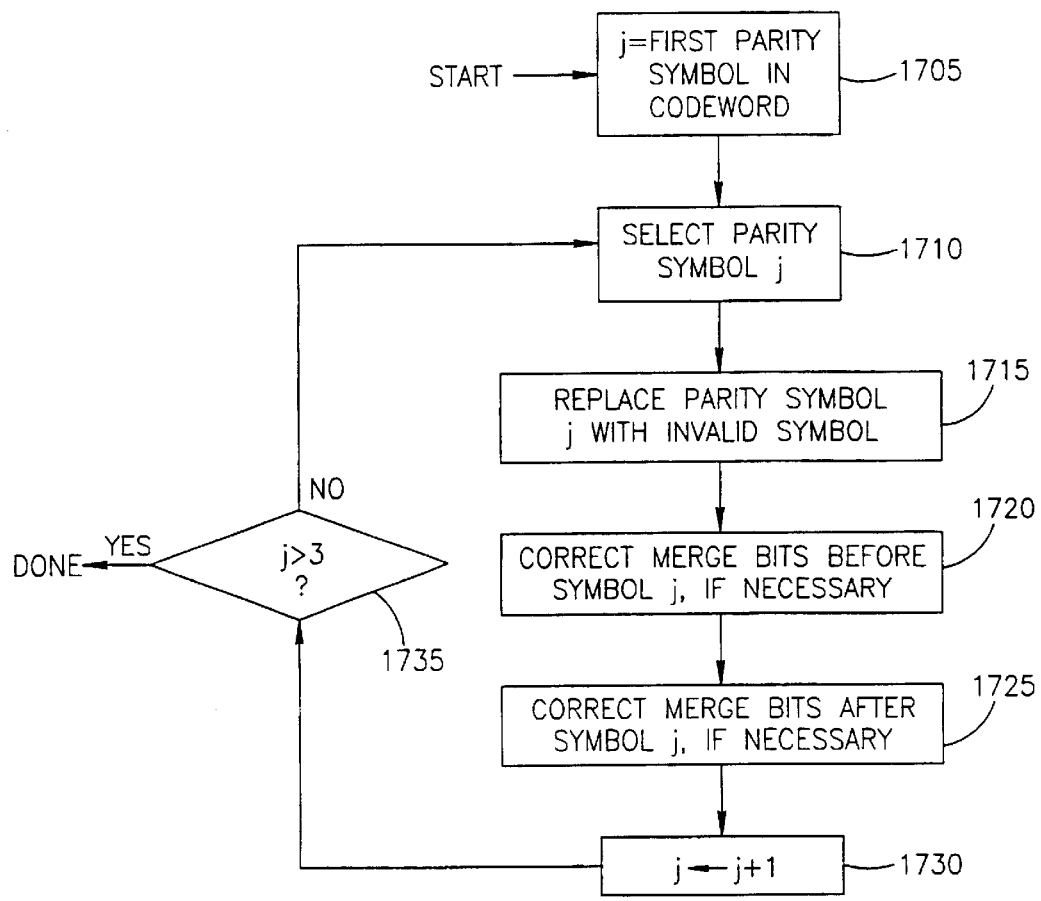
FIG. 17 is a flowchart showing the steps of a first method of disabling error-correction.

This is illustrated in the flowchart of FIG. 17, which starts with a step 1705 to select the first parity symbol in the codeword, and then loops from a selection step 1710. to a replacement step 1715, in which the correct parity symbol is replaced with an invalid symbol. to merge bit adjustment steps 1720 and 1725 (see below). through an iteration step 1730, and a decision 1735 which insures that 3 erasures are performed in the parity symbols of the codeword.

Overwriting a Symbol with an Arbitrary Erroneous Symbol

As noted above, it is possible to disable error-correction within a codeword by overwriting a suitable number of parity symbols within the codeword with arbitrary erroneous symbols. An arbitrary erroneous symbol is created by overwriting a symbol with a valid symbol having any incorrect value. For example, if a symbol has a value (expressed in hexadecimal notation) of E7, overwriting this symbol with a symbol having a value different from E7 (00, 01, . . . , E6, E8, E9, . . . , FF in hexadecimal notation) will result in an arbitrary erroneous symbol. Because an arbitrary erroneous symbol is a valid EFM symbol, the location of an arbitrary erroneous symbol (or that the arbitrary erroneous symbol is erroneous) is not known a priori to the Red Book decoder, but can be determined only by performing an error-correction on the codeword containing the arbitrary erroneous symbol. Overwriting an original symbol with a symbol having any erroneous value will create an arbitrary erroneous symbol. There are many simple ways of assuring that the overwritten symbol has an erroneous value. One way is simply to select the erroneous value based on a test for zero. For example, if the original symbol has a non-zero value, then overwrite it with the symbol 0-1-0-0-1-0-0-0-1-0-0-0-0-0, which represents the value zero. If the original symbol has a zero value, however, then overwrite it with any non-zero symbol, such as 0-0-1-0-0-0-0-0-0-1-0-0-1-0, which represents the value FF (hexadecimal). Another way of replacing a symbol with an arbitrary erroneous symbol is to replace the original symbol with a symbol representing the complement of the original symbol. Other schemes can be used which involve the replacement of an original symbol with a symbol having an erroneous value according to a table, such that the number of transitions in the replacement symbol has the same evenness or oddness as that of the original symbol and such that no changes are required in the merge bits (see below).

Figure 18:
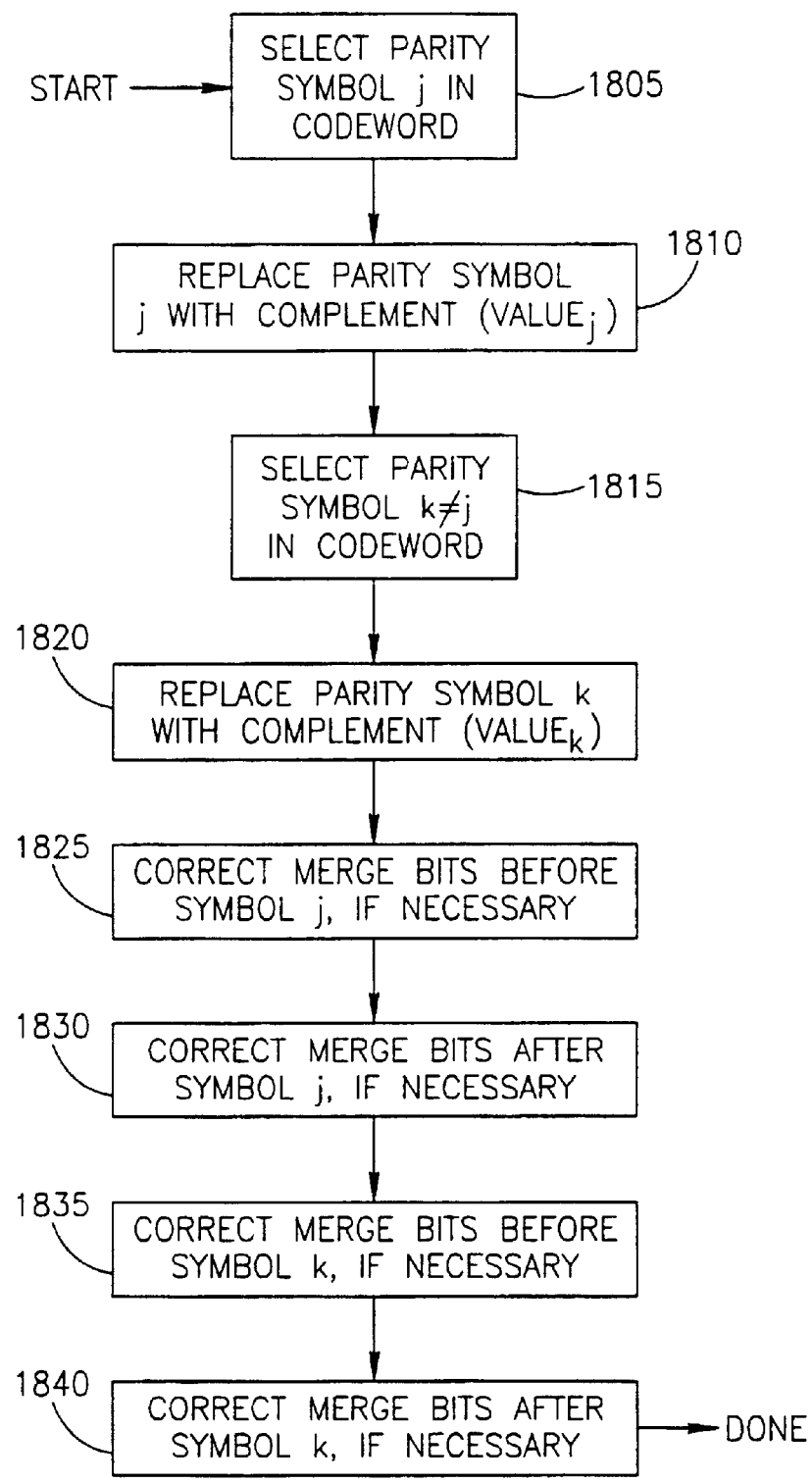
FIG. 18 is a flowchart showing the steps of a second method of disabling error-correction.

This is illustrated in the flowchart of FIG. 18 which begins with the selection of an arbitrary parity symbol in the codeword in a step 1805 and the replacement of the original symbol with an arbitrary erroneous symbol representing the complement of the original symbol in a step 1810. Next, in a step 1815, another arbitrary parity symbol is selected, and a similar replacement is done for this second parity symbol, in a step 1820. Finally, in steps 1825, 1830, 1835, and 1840, the merge bits prior and subsequent to the selected parity symbols are adjusted (see below).

Correcting Merge Bits

Figure 13:
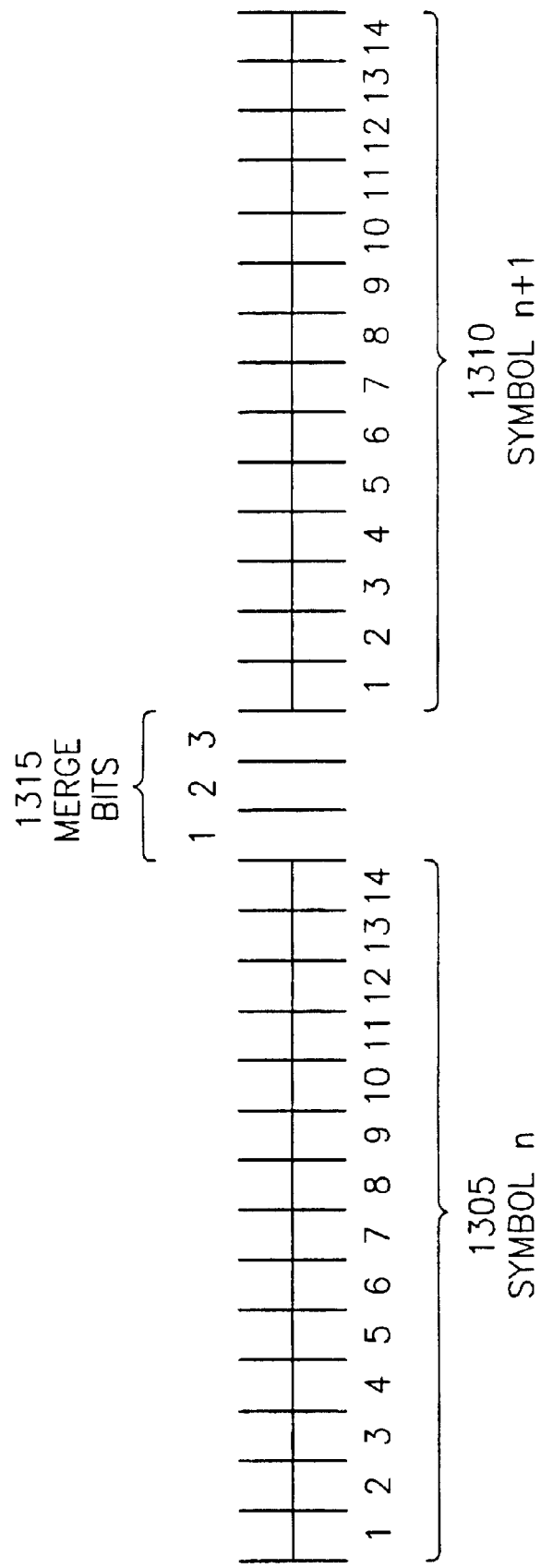
FIG. 13 illustrates the merge bits of a prior art compact disc.

When overwriting symbols, it is necessary to check the merge bits prior to and subsequent to the overwritten symbol to make sure that the Red Book RLL rules are obeyed in the joining of the adjacent symbols. As illustrated in FIG. 13, merge bit sequence 1315 contains 3 channel bits placed between two consecutive symbols 1305 and 1310. Symbols 1305 and 1310 each contain 14 channel bits. As specified in the Red Book, there are four possible merge bit sequences, denoted in a manner similar to that of symbols, as described previously: 0-0-0, 0-0-1, 0-1-0, and 1-0-0. Depending on the position of the final transition of symbol 1305 and the position of the initial transition of symbol 1310, there is at least one merge bit sequence which assures that the Red Book RLL rules are obeyed for the consecutive symbols. Merge bit sequences are selected automatically by the Red Book encoder that records the symbols onto the compact disc, such as Red Book encoder 625 (FIG. 6). If, however, one or both of symbols 1305 and 1310 are overwritten, such as by an arbitrary erroneous symbol, it may be necessary to change the merge bit sequence between symbols 1305 and 1310 to make sure that the Red Book RLL rules are obeyed.

For example, if symbol 1305 has a value 11 (hexadecimal), the channel bit representation of this symbol according to the Red Book EFM encoding is 1-0-0-0-0-0-0-0-0-0-0-0-0. If symbol 1310 has a value F0 (hexadecimal), the channel bit representation of this symbol according to the Red Book EFM encoding is 0-0-0-0-0-1-0-0-1-0-0-0-1-0. To obey the Red Book RLL rules for consecutive symbols, merge bit 1315 sequence can be 0-1-0. If, however, symbol 1305 is overwritten by the invalid symbol 0-0-1-0-0-0-0-0-0-0-0-0-0-1 for an erasure, then merge bit sequence 1315 cannot be 0-1-0, but could be 0-0-1.

FIG. 17 is a flowchart conceptually showing the steps involved in disabling error-correction for a codeword by overwriting the codeword's parity symbols with erasures. The procedure starts with a step 1705 in which the first parity symbol of the codeword is located. For a C1 codeword, the first parity symbol is symbol 29 (ignoring the control symbol, and considering the C1 codeword to start with symbol 1). Likewise, for a C2 codeword, the first parity symbol is symbol 13 (also ignoring the control symbol, and considering the C2 codeword to start with symbol 1). Within loop steps 1710 through 1730 having a loop test 1735, each subsequent parity symbol is selected, and a replacement 1715 puts an invalid symbol in place of the selected parity symbol. Then in steps 1720 and 1725 the relevant merge bits are checked and corrected as necessary.

As mentioned previously, it is beneficial if the overwritten symbol with the erroneous value is such that the same merge bits apply for the overwritten symbol as for the original symbol. This will be the case if the overwritten symbol has the same number of leading and trailing 0's as the original symbol, and if the number of transitions in the overwritten symbol has the same evenness or oddness as that of the original symbol. For example, if the original symbol is 1-0-0-1-0-0-0-0-0-0-0-1-0, representing the value 78 (hexadecimal), then replacing the original symbol with the symbol 1-0-0-1-0-0-1-0-0-1-0-0-1-0 representing the value F2 (hexadecimal) will require no changes to the merge bits or other symbols. Both the original symbol and the overwritten symbol with the erroneous value have an odd number of transitions (3 and 5, respectively), and both have no leading zeros and one trailing zero. Not all symbols, however, can necessarily be replaced in precisely this manner.

Locating Symbols for Overwriting

Figure 11A:
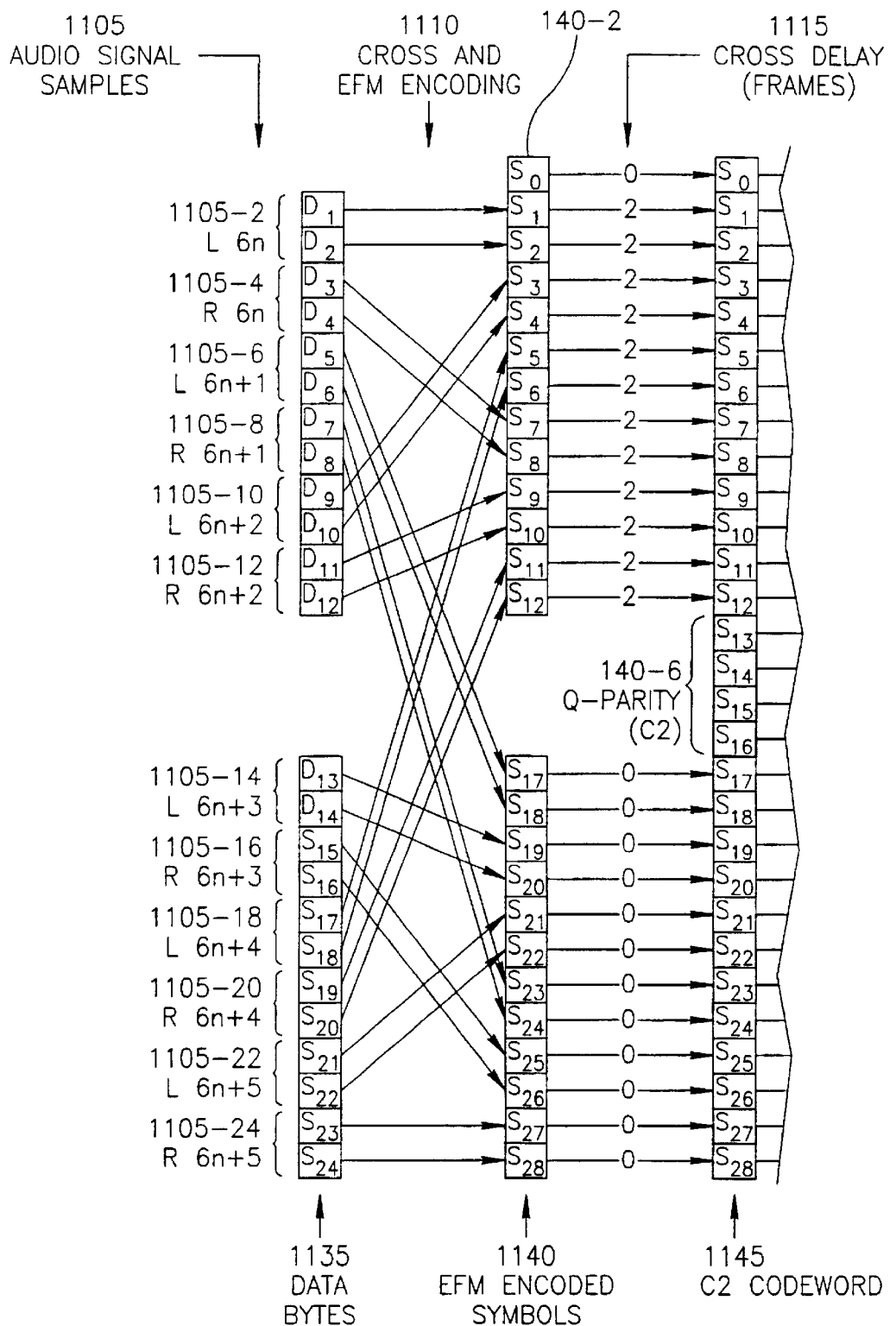
FIG. 11 illustrates the cross-interleaving of data on a prior art compact disc.
Figure 11B:
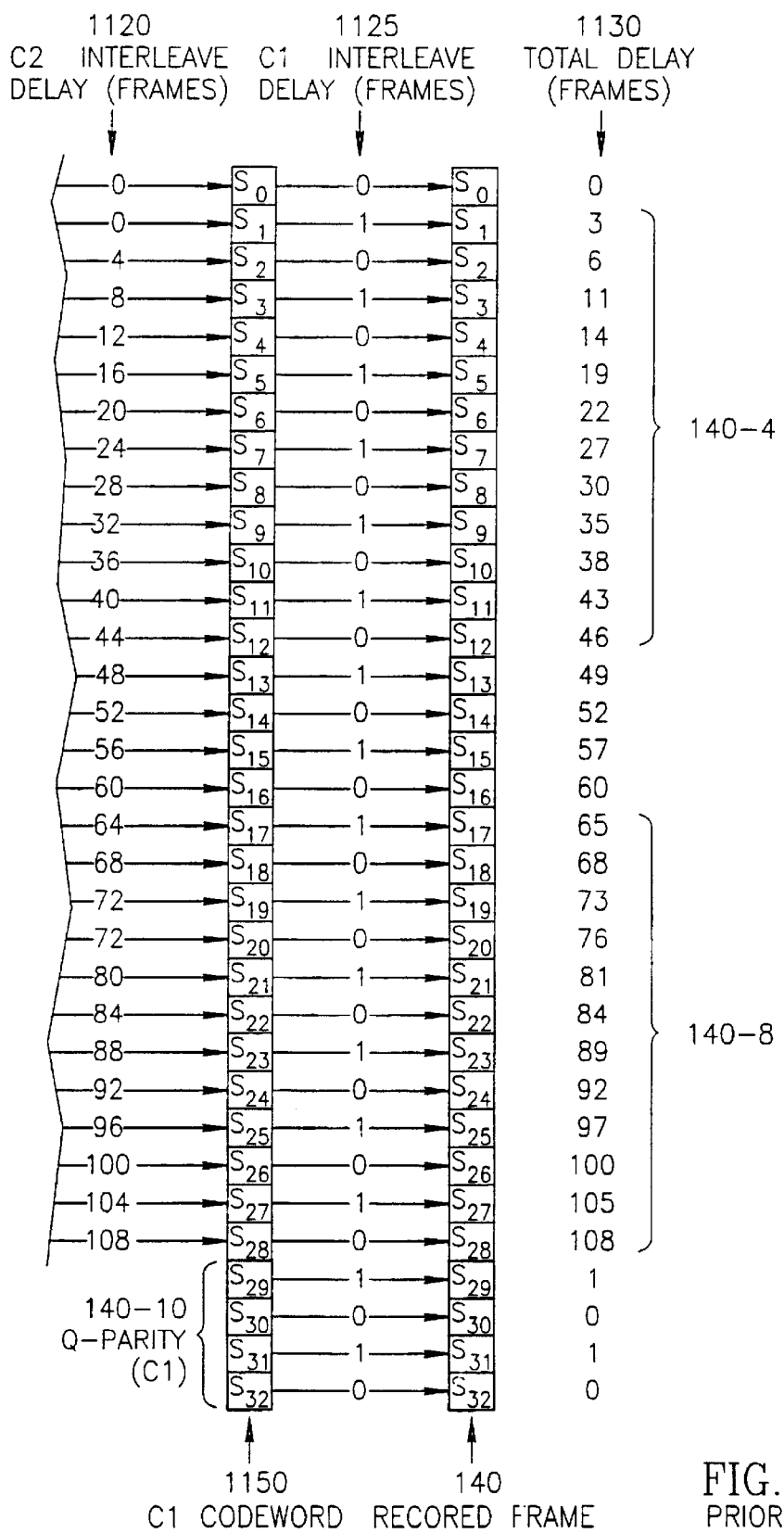

In order to overwrite symbols of a specific codeword (for example, the parity symbols of the codeword), it is necessary to be able to locate the positions of an arbitrary symbol in a codeword. FIG. 11 illustrates the prior art mapping of arbitrary data bytes to C1 codewords and C2 codewords, and FIG. 12 provides an example of this prior-art mapping, as detailed below.

Suppose that it is desired to replace audio data sample 910 with erroneous value 920 (FIG. 9) to create overwritten latent noise, and that audio data sample 910 happens to be the 321st right stereo channel audio data sample within record data block 110 (FIG. 1). Each audio data sample contains 16 bits, or 2 bytes, of data, and thus every 24 bytes of data represents 6 left stereo channel audio data samples and 6 right stereo channel audio data samples. It is easiest to compute using a zero-based index, meaning that the 321st audio data sample has an index of 320. Dividing 320 by 6 to obtain a quotient of 53 with a remainder of 2, it is seen that audio data sample 910 is the 3rd right stereo channel audio data sample in the 54th group of 24 bytes in record data block 110 (counting from one—to index from zero, subtract 1 to get an index of 2 for the audio data sample and 53 for the group). That is, as is shown in FIG. 11, such an audio data sample (audio data sample 910 in this example) is contained in a 2-byte word 1105-12. Thus, audio data sample 910 is represented by data bytes $D_{11}$ and $D_{12}$, which map to symbols $S_9$ and, respectively.

Figure 12A:
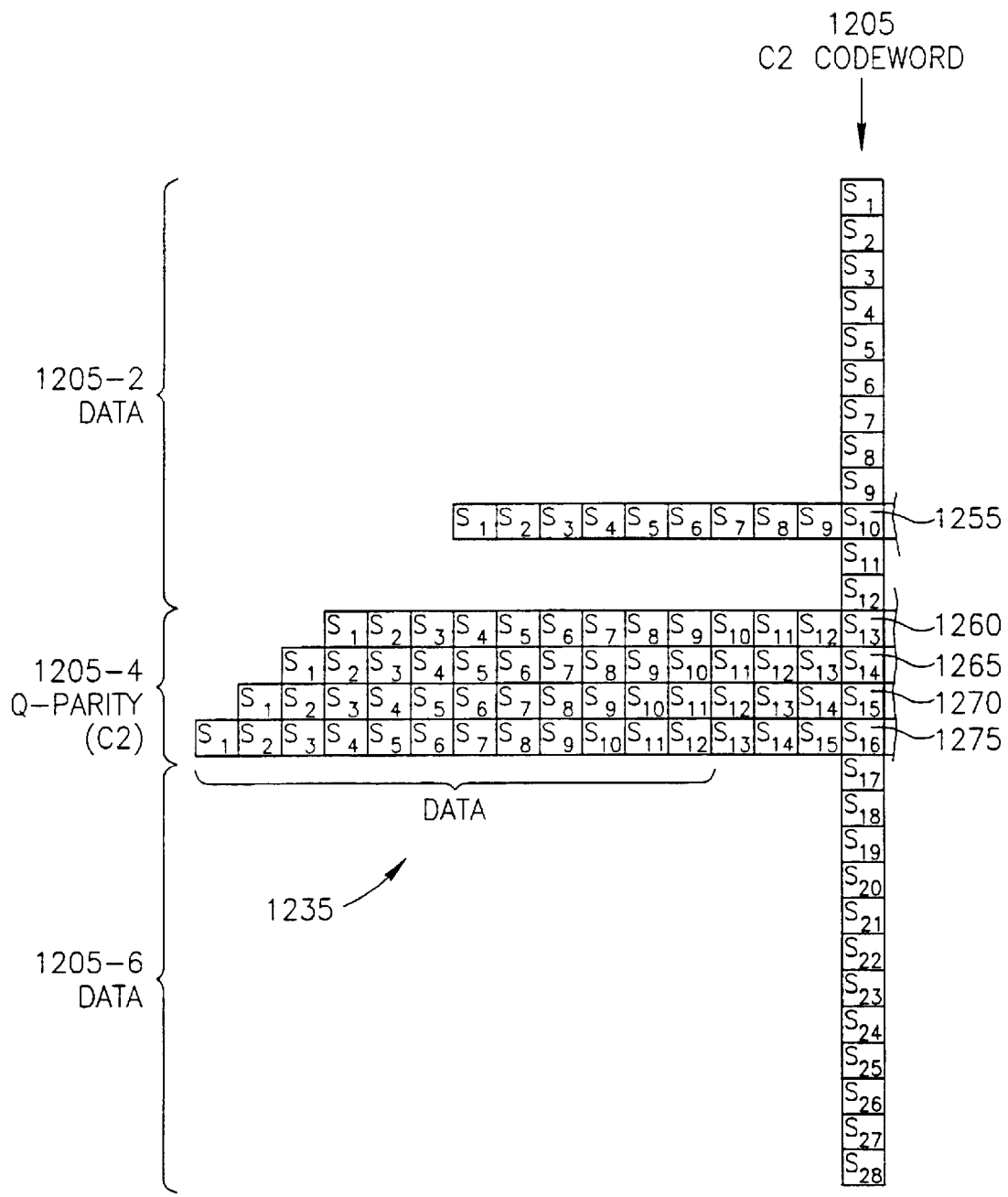
FIG. 12 illustrates the C1 codewords and C2 codewords of a prior art compact disc.
Figure 12B:
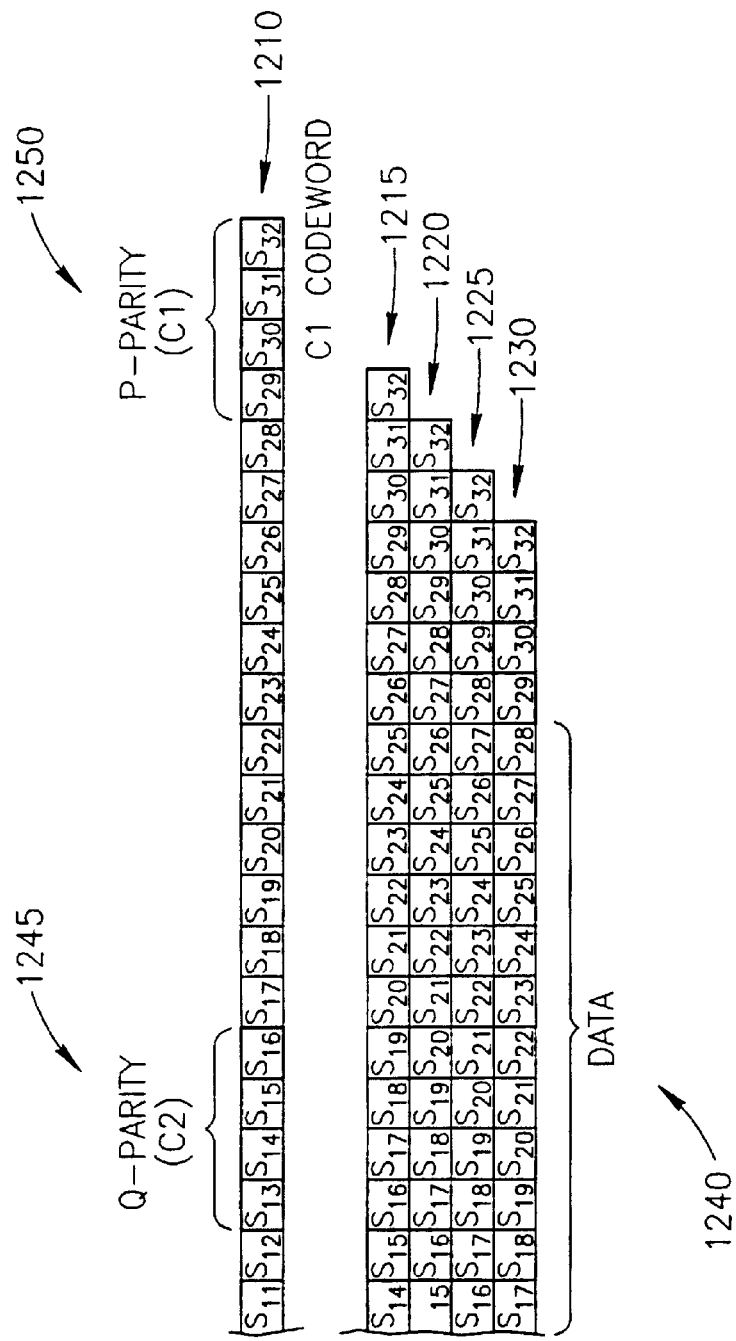

Taking symbol $S_{10}$ as a specific example, FIG. 12 illustrates a prior art C1 codeword 1210 and a prior art C2 codeword 1205, both of which contain a symbol $S_{10}$ 1255, and illustrate the general rules that: (a) any given symbol representing a data byte is contained in exactly one C1 codeword and exactly one C2 codeword; and (b) any C1 codeword/C2 codeword pair contains at most one symbol in common to the two codewords. That is, every symbol corresponding to a data byte corresponds to the intersection of one C1 codeword and one C2 codeword, as illustrated in FIG. 12, where symbol $S_{10}$ 1255 corresponds to the intersection of C1 codeword 1210 and. The symbols corresponding to data bytes in C2 codeword 1205 are denoted as symbols $S_1$ through $S_{12}$ 1205-2 and symbols S17 through $S_{28}$ 1205-6; and the C2 parity symbols of C2 codeword 1205 are denoted as Q-parity symbols 12054, including a symbol $S_{13}$ 1260, a symbol $S_{14}$ 1265, a symbol $S_{15}$ 1270, and a symbol $S_{16}$ 1275.

Q-parity symbols 1205-4 are also contained in C1 codewords. Symbol $S_{13}$ 1260 is contained in a C1 codeword 1215, symbol $S_{14}$ 1265 is contained in a C1 codeword 1220, symbol $S_{15}$ 1270 is contained in a C1 codeword 1225, and symbol $S_{16}$ 1275 is contained in a C1 codeword 1230. Each of C1 codewords 1215, 1220, 1225, and 1230 also contain data symbols 1235 and 1240, as well as Q-parity symbols 1245. Each of C1 codewords 1215, 1220, 1225, and 1230 also contain P-parity symbols 1250 containing symbols $S_{29}$ through $S_{32}$. P-parity symbols $S_{29}$ through $S_{32}$ are not contained in any C2 codewords.

To disable error-correction for symbol $S_{10}$ 1255, it is first necessary to disable error-correction for both C1 codeword 1210 and C2 codeword 1205 by employing the techniques described previously to overwrite the parity symbols of C1 codeword 1210 and C2 codeword 1205 with invalid symbols or arbitrary erroneous symbols. However, as noted above, Q-parity symbols 1205-4 are contained in C1 codewords, and are therefore themselves subject to error-correction. Consequently, to disable error-correction for C2 codeword 1205 it is also necessary to disable the error-correction for C1 codewords 1215, 1220, 1225, and 1230.

Continuing with this example, it is easy to use the Red Book cross-interleaving scheme. summarized in FIG. 11, to locate the various symbols for overwriting. In FIG. 11, original data bytes 1135 corresponding to audio signal samples 1105 are crossed into EFM-encoded symbols 1140 via a cross and EFM encoding operation 1110. A control control symbol $S_0$ 140-2 is appended and Q-parity symbols 140-6 are interspersed between the data symbols. After a cross-delay operation 1115, the symbols are delayed to form a C2 codeword 1145. Then. following a C2 interleaving delay 1120, the symbols are delayed to form a C1 codeword 1150, with appended P-parity symbols 140-10. Finally, after a C1 interleaving delay 1125, the symbols are delayed to form a recorded frame 140, whose symbols have a total frame delay as indicated in a column 1130.

Symbol $S_{10}$ 1255 itself is delayed by a total of 38 frames. Thus, for this example, the second data byte of the 321st right stereo channel audio data sample (now in symbol $S_{10}$) goes from the 54th group of 24 data bytes to the 92nd recorded frame (54+38=92). Moreover, this symbol is in the 92nd C1 codeword (since the C1 interleaving delay for symbol $S_{10}$ is zero), and also in the 56th C2 codeword, since the cross-delay is 2 frames (54+2=56). Thus. P-parity symbols $S29$ and $S_{30}$ for symbol $S_{10}$ 1255 in C1 codeword 1210 (FIG. 12) are in the 93rd recorded frame (they have a 1-frame C1 interleaving delay), whereas P-parity symbols $S_{31}$ and $S_{32}$ for symbol $S_{10}$ 1255 in C1 codeword 1210 are in the 92nd recorded frame (they have a zero-frame C1 interleaving delay).

Obtaining the C2 codeword Q-parity symbol locations for symbol $S_{10}$ 1255 is similarly done. For example, Q-parity symbol $S_{13}$ has a total delay of 49 frames (from column 1130 of FIG. 11), which is 11 frames more than that of symbol $S_{10}$ 1255 itself, so Q-parity symbol $S_{13}$ 1260 (FIG. 12) is in the 103rd recorded frame (92+11=103). Likewise, Q-parity symbol $S_{14}$ 1265 is in the 106th recorded frame, Q-parity symbol $S_{15}$ 1270 is in the 111th recorded frame, and Q-parity symbol $S_{16}$ 1275 is in the 114th recorded frame. This procedure also readily obtains the locations of all the P-parity symbols 1250 in C1 codewords 1215, 1220, 1225, and 1230.

Note that an audio data sample contains two data bytes, and hence this procedure for data symbol $S_{10}$ must be repeated for data symbol $S_9$, which corresponds to the other byte of audio data sample 1105-12 (FIG. 11).

Copy-Protecting an Audio Compact Disc

In a practical application of the present invention, latent noise is overwritten onto the audio compact disc to be copy-protected so that the original audio signal will be inaudible in an unauthorized copy. There are various ways of doing this.

Figure 14:
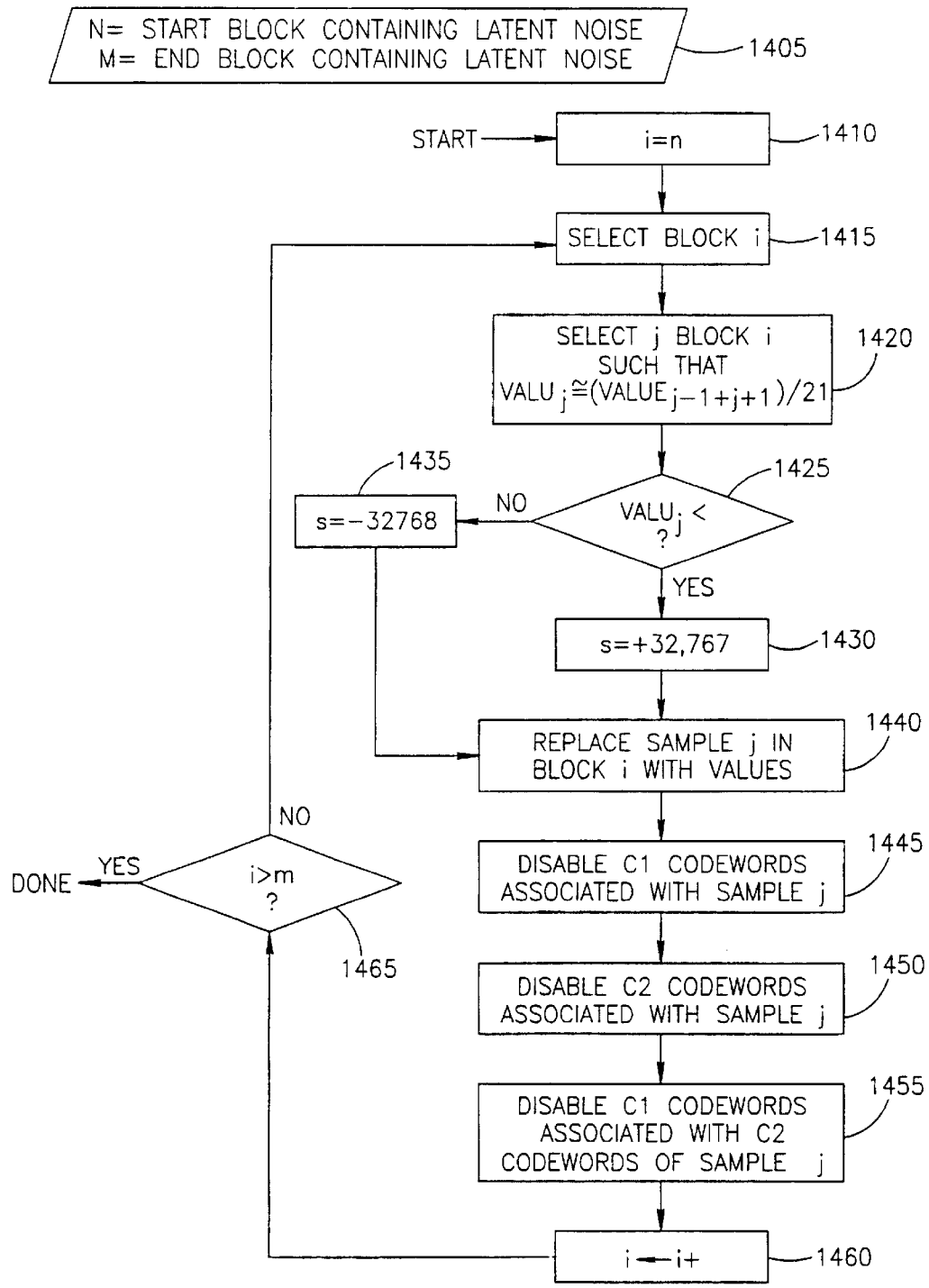
FIG. 14 is a flowchart showing the steps of a first embodiment of the present invention.

FIG. 14 is a flowchart illustrating a conceptual implementation of a first preferred embodiment of the present invention. A data set 1405 contains the start block n and the end block m for the writing of latent noise onto a target audio compact disc. To start, a block index variable i is initialized to n in a step 1410. Then, a loop from steps 1415 through 1460 iterates i and tests for completion in a step 1465.

Within the loop, block i is selected in step 1415, and an audio data sample j of block i is selected in a step 1420 such that the value of audio data sample j is exactly halfway between the immediately prior and immediately subsequent values. This will insure that the error-concealment will reconstruct the exact value of audio data sample j, as illustrated in FIG. 10 for audio data sample 910. Next, to overwrite the latent noise, a test 1425 checks the sign of audio data sample j, and in a step 1440 overwrites the original audio data sample j with either −32768 or +32767, whichever is further from the original value of audio data sample j, as determined in test 1425 via substitutions 1435 or 1430. This insures that the latent noise superimposed impulse overwriting audio data sample j is as severe as possible. Next, in a step 1445, the C1 codewords 1210 (FIG. 12) associated with audio data sample j must be disabled, using one or more of the techniques described previously. Then, in a step 1450, the C2 codewords 1205 associated with audio data sample j must also be disabled. Finally, in a step 1455, the C1 codewords 1215, 1220, 1225, and 1230 associated with the C2 parity symbols of C2 codewords 1205 must be disabled. The loop then progresses through iteration 1460 to completion with test 1465.

Figure 15:
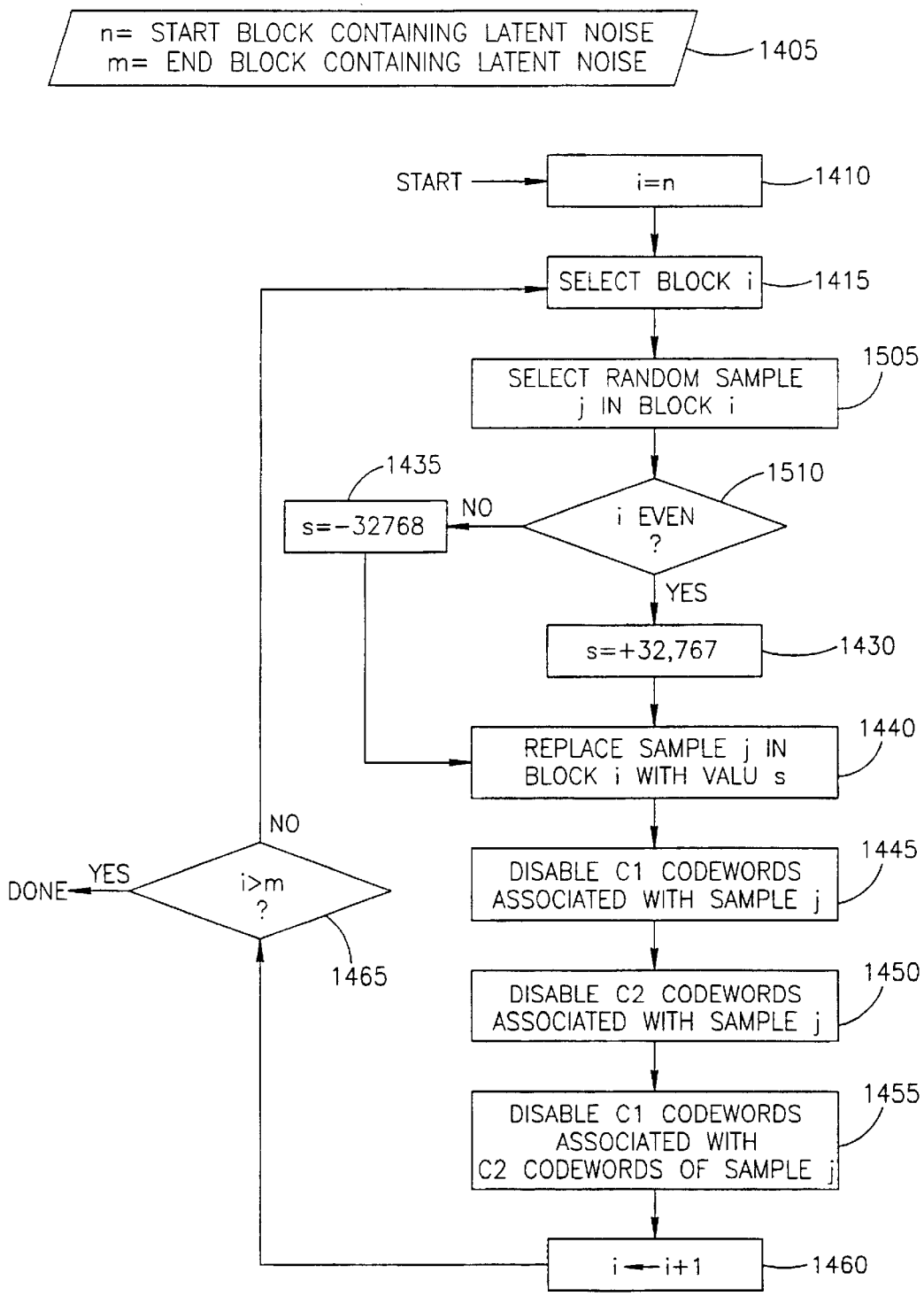
FIG. 15 is a flowchart showing the steps of a second embodiment of the present invention.

FIG. 15 is a flowchart illustrating a conceptual implementation of a second preferred embodiment of the present invention. The block selection, looping, overwriting of latent noise, and codeword disabling is the same as described for the first preferred embodiment illustrated in FIG. 14, but the technique of selecting audio data samples is different. In this embodiment, an audio data sample j is simply selected at random from the audio data samples of the current block. If the block index i is even, the replaced erroneous value is +32767, but if the block index i is odd, the replaced erroneous value is −32768, as determined by a test 1510 and substitutions 1430 and 1435. This technique assures that sequential superimposed impulses alternate in sign to produce a latent noise with an audible fundamental centered around 75 Hz.

Figure 16:
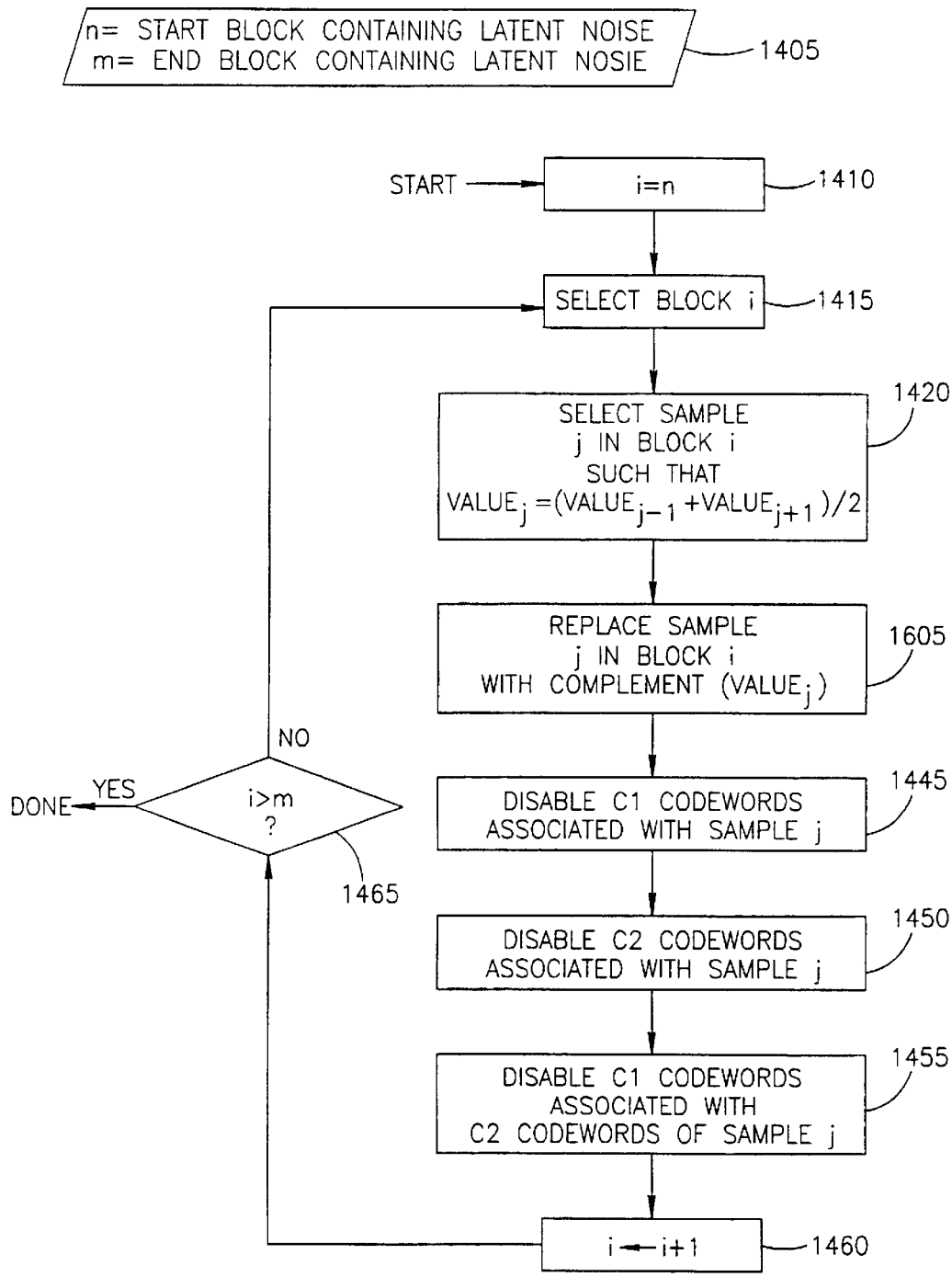
FIG. 16 is a flowchart showing the steps of a third embodiment of the present invention.

FIG. 16 is a flowchart illustrating a conceptual implementation of a third preferred embodiment of the present invention. The block selection, looping, technique of selecting audio data samples, overwriting of latent noise, and codeword disabling is the same as described for the first preferred embodiment illustrated in FIG. 14, but the erroneous value substitution is different. Here, in a step 1605, the audio data sample is complemented and the complement is used as an erroneous value. The advantage of this approach is that it produces a latent noise which is a distortion of the original sound, and is not susceptible to being neutralized by software that detects extreme values of superimposed impulses, as are used in the previous embodiments.

Figure 19:
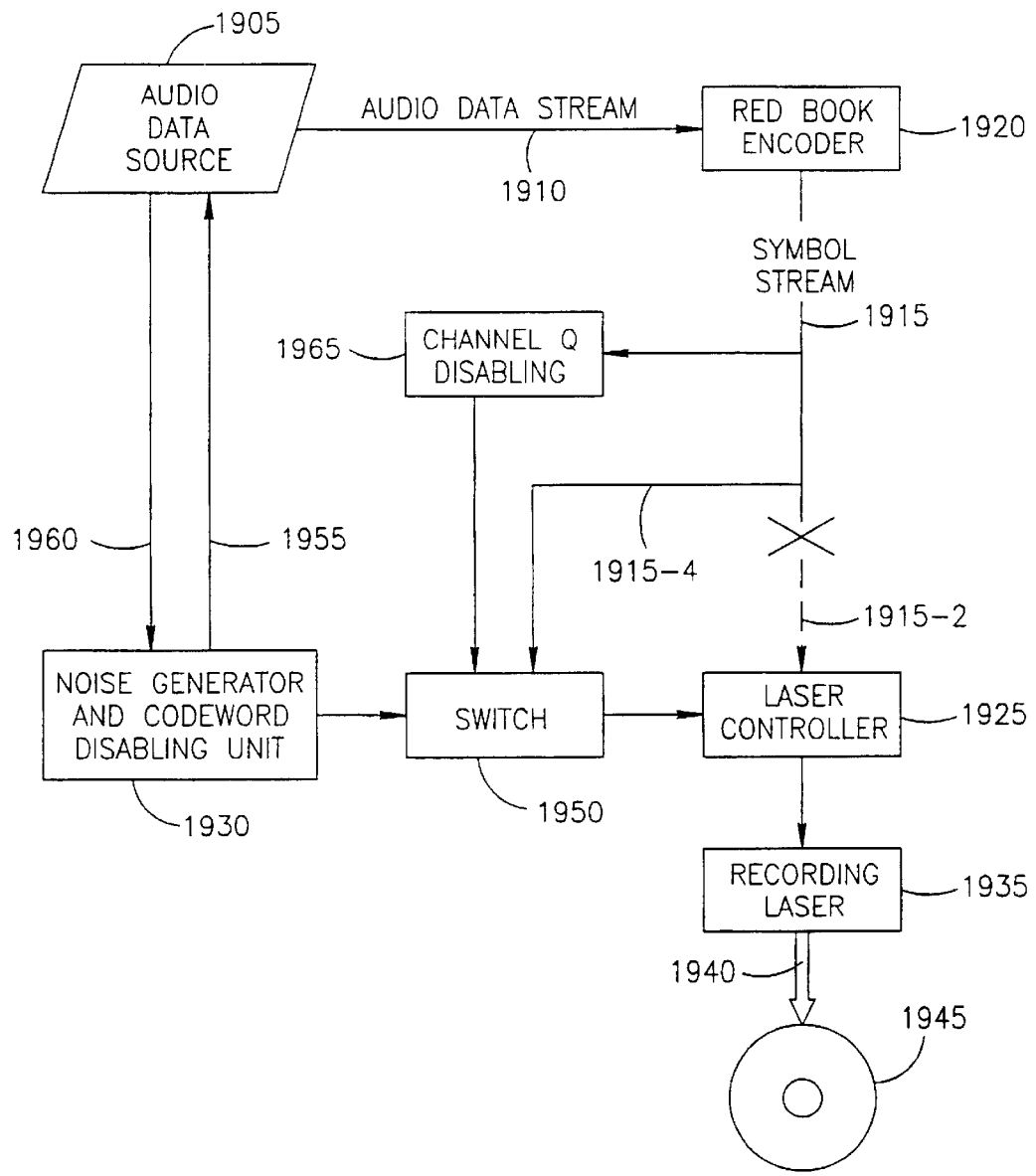
FIG. 19 is a conceptual block diagram of a recording system for a compact disc with copy-protection according to the present invention.

A system for copy-protecting an audio compact disc is illustrated in FIG. 19. An audio data source 1905 provides an audio signal which is to be recorded onto a copy-protected audio compact disc, and this results in an audio data stream 1910 into a Red Book encoder 1920, which encodes the audio data samples and outputs a symbol stream 1915. In a prior-art recording system, symbol stream 1915 would progress onto a laser controller 1925 via an input 1915-2, but input 1915-2 is disconnected as shown, and instead symbol stream 1915 progresses via an input 1915-4 to a switch 1950, whose output goes to laser controller 1925. The alternate input to switch 1950 is from a noise generator and codeword disabling unit 1930, which receives input 1960 from audio data source 1905, and can also modify audio data source 1905 directly via an output 1955. Noise generator and codeword disabling unit 1930 uses input 1960 to determine the locations and values of audio data samples, and uses output 1955 to overwrite audio data source 1905 with superimposed impulses, as described previously. Noise generator and codeword disabling unit 1930 also presents substituted parity symbols to switch 1950, which passes the substitute parity symbols to laser controller 1925 in place of the original parity symbols in symbol stream 1915 from Red Book encoder 1920. This is done in accordance with the method described herein to disable the codewords related to the symbols of the superimposed impulses. Finally, as in prior-art recording systems, laser controller 1925 controls a recording laser 1935 to record audio compact disc/audio compact disc master 1945, depending upon whether the recording system illustrated in FIG. 19 is intended for use in the production of stamped discs, or for the direct production of recorded discs. The resulting recorded disc or stamped discs will be copy-protected according to the present invention.

Figure 20:
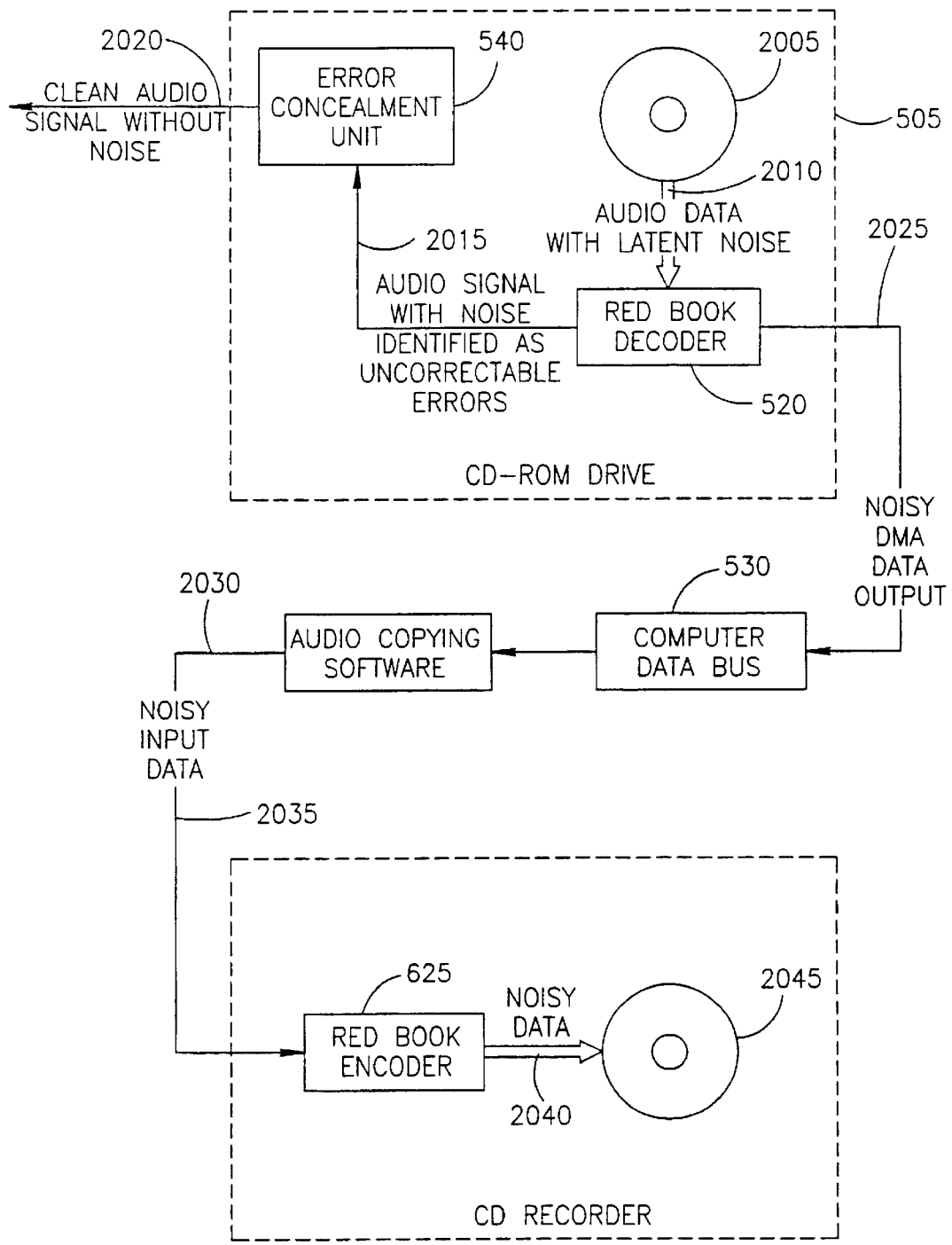
FIG. 20 illustrates the results of attempting to copy an audio compact disc with copy-protection according to the present invention.

FIG. 20 illustrates the playback and attempted duplication of an audio compact disc which has been copy-protected according to the present invention. An original copy-protected audio compact disc 2005 is placed within CD-ROM drive 505, and audio data 2010 overwritten with latent noise is sent to Red Book decoder 520, which outputs via an audio channel an audio signal 2015 having the latent noise identified as uncorrectable errors to error-concealment unit 540, which conceals the uncorrectable errors and outputs a clean audio signal 2020 without noise. Red Book decoder 520 also outputs a noisy computer data interface input 2025, whose errors are not concealed, to computer data bus 530, which is then handled by audio copying software 605. Copying software 605 in turn sends noisy input data 2035 to Red Book encoder 625, which writes noisy data 2040 to make a noisy copy 2045 of original audio compact disc 2005.

Reinforcing Latent Noise Copy-Protection by Disabling the Positioning Information of Channel Q While latent noise as described above affords a good measure of copy-protection to audio compact discs, there exist CD-ROM drives which employ error-concealment to audio signals read as data samples, and as a result, such CD-ROM drives are able to make unauthorized copies of audio compact discs containing latent noise which do not reproduce the latent noise on the unauthorized copies. However, such CD-ROM drives are generally more sophisticated than CD-ROM drives which reproduce the latent noise on the unauthorized copies, and these more sophisticated CD-ROM drives tend to rely more heavily on positioning reference inputs into position unit 570 (FIG. 6), which, in the case of audio compact discs, is solely control and display information 550 from Red Book decoder 515.

Accordingly, the present invention augments the ability of latent noise as described above for copy-protecting audio compact discs by exploiting the fact that there is an inherent difference between the way an audio player accesses the tracks of a compact disc for the purpose of reproducing audio signals and the way a typical CD-ROM drive accesses the data stored on a compact disc for the purpose of reading the data as input into a computer. An audio player is essentially a streaming device which continuously reads recorded audio data from the compact disc in real-time and converts the audio data into an audio signal for output. Once the audio player locates the start of a track of audio material and begins to output the signal therefrom, the reading of the audio data from the compact disc is substantially a continuous and linear playback of the audio data, and the audio player normally has no further need to locate data on the compact disc until such time as the user directs the audio player to locate the start of another track or return to the beginning of the currently-played track. In contrast, however, computers demand data having randomly-selectable addresses, and a CD-ROM drive responding to computer control continually receives demand for data corresponding to specified addresses, and to handle this demand a CD-ROM drive must therefore continually seek the requested data according to the address thereof as directed by the computer. The present invention makes use of this fact to interfere with data-seeking by a CD-ROM drive while still allowing an audio player to locate the start of a track of audio material for sequential reading. The result is that an audio compact disc which is copy-protected by the present invention can be played normally by an audio player. However, for many of the more sophisticated CD-ROM drives used to read the audio compact disc for purposes of unauthorized copying utilizing a configuration as illustrated in FIG. 6, the CD-ROM drive, as directed by copying software 605, is unable to reliably locate the requested data sectors for playback into CD recorder 600. In consequence, for such CD-ROM drives, either the copying process will completely fail because of the inability of the CD-ROM drive to read the required data, or the unauthorized copy will be corrupted by noise and other audible artifacts resulting from erroneous data returned by the CD-ROM drive in unsuccessful attempts to locate and read data which is not accessible except by continuous streaming starting at the beginning of the track. In either case, unauthorized copies made using these CD-ROM drives will be rendered substantially unusable.

As described above an(i illustrated in FIG. 1 and FIG. 2, the Red Book standard specifies that a control symbol 140-2 be included at the beginning of each frame 140 of data. The purpose of control symbol 140-2 is to permit the encoding of small amounts of non-audio data into the recorded data stream for coordinating the playback of the audio data and displaying certain parameters during playback. For example, in an audio compact disc with many tracks of audio data it is desirable to be able to encode the track number of each track within the recorded data so that an audio player can locate a specific track for playback. In addition, in some cases it is desirable that the running time of the playback for each track be available for display to the user. Track number, running playback time, and other types of non-audio information are encoded using control symbols, in what is referred to as "subcode channels".

Figure 21:
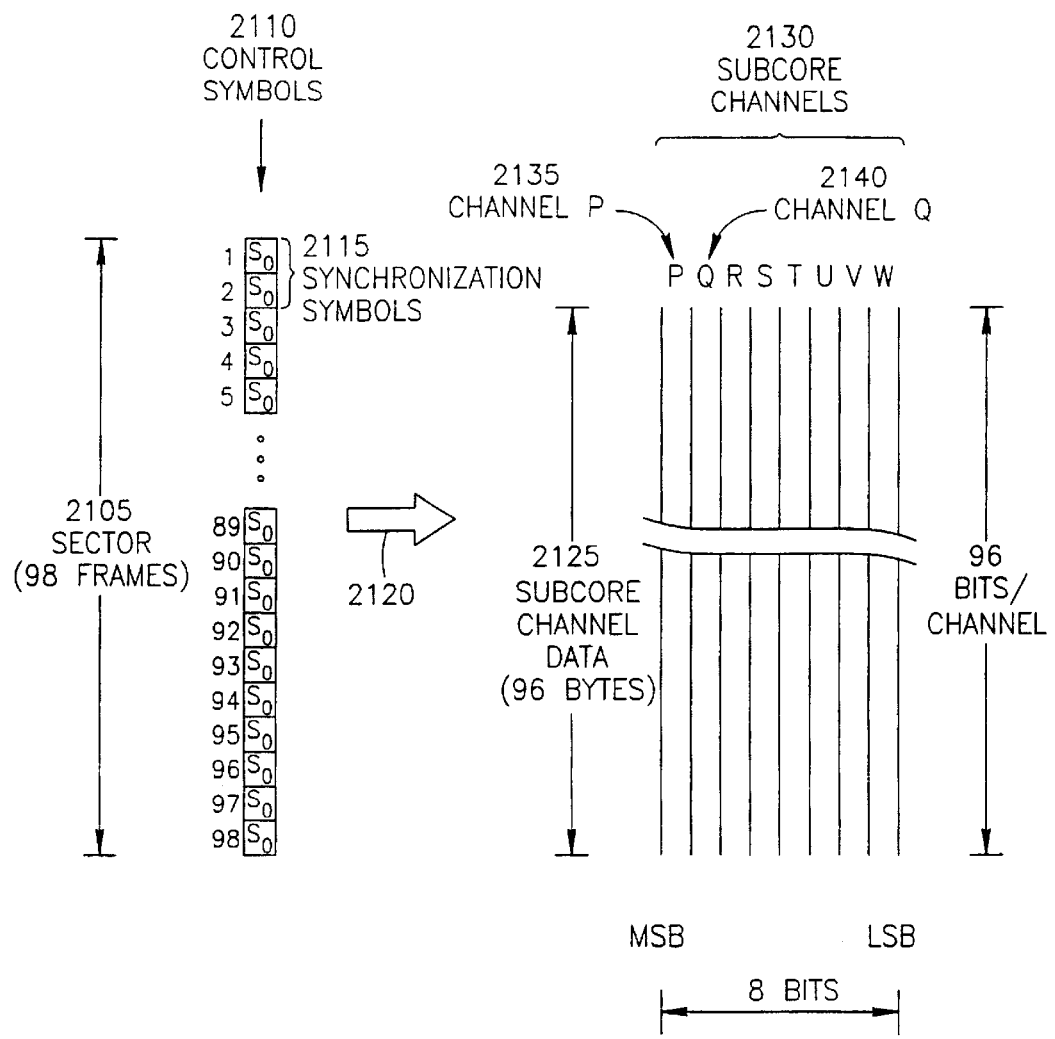
FIG. 21 shows the subcode channels of a prior art compact disc according to the Red Book standard.

As is shown in FIG. 1, a sector 150 contains a set 1504 of 98 sequential frames. This results in a sequence of 98 control symbols within each sector. FIG. 21 illustrates how this sequence is formatted into subcode channels. A sector 2105 containing 98 frames has a sequence 2110 of control symbols. The first 2 control symbols of sequence 2110 are synchronization symbols 2115, which carry no data, and are used merely to synchronize the beginning of each subcode channel sequence. Upon a decoding operation 2120, this leaves subcode channel data 2125 containing 96 bytes. (Again, note that this is 96 bytes of subcode channel data per sector.) The 8 bits of each byte are formatted as 8 independent subcode channels 2130, designated as subcode channels P (corresponding to the most significant bit of the byte), Q, R, S, T, U, V, and W (corresponding to the least significant bit of the byte). A channel P 2135 is specified by the Red Book for use as a 2-second (minimum duration) flag indicating the start of a track. A channel Q 2140 is used for a number of important functions, including sector addressing, and is discussed in more detail below. Channels R through W inclusive are not designated to have any purpose by the Red Book standard.

Figure 22A:
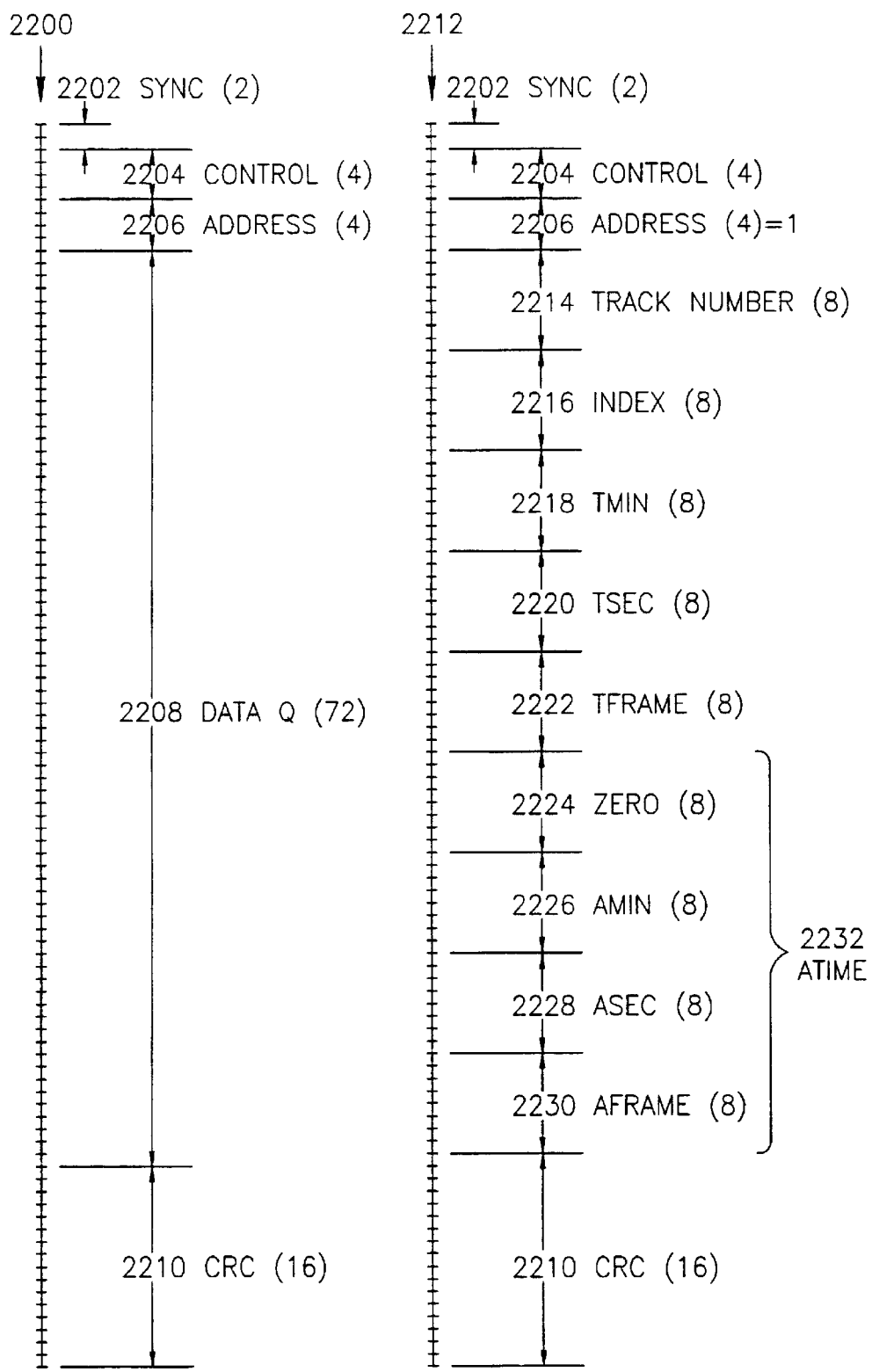
FIG. 22 shows the prior art channel Q of a compact disc according to the Red Book standard.
Figure 22B:
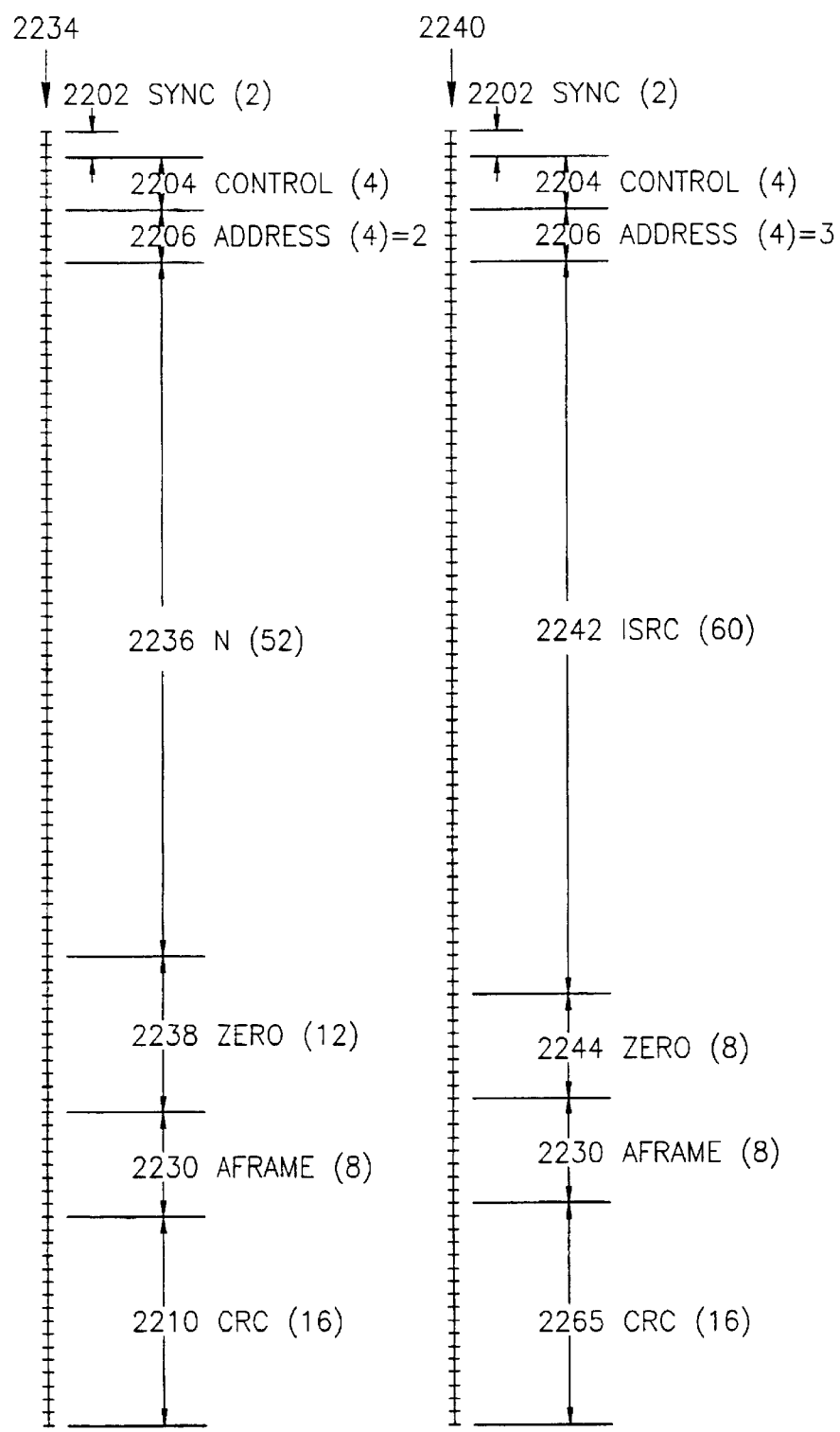

The 96 bits of channel Q are formatted in a number of different ways depending on the desired function, as illustrated in FIG. 22.

The format of channel Q is specified in the Red Book as illustrated in FIG. 22. The general channel Q sequence 2200 contains 98 bits, of which 96 carry data. Synchronization bits 2202 are decoded from synchronization symbols 2115 (FIG. 21), leaving 96 bits for data. The 96 data bits are formatted as a control word 2204 (4 bits), an address word 2206 (4 bits), a data Q field 2208 (72 bits), and a CRC 2210 (16 bits) for detecting errors in channel Q. Note that CRC 2210 can be used to detect errors, but not to correct errors. There is no error-correction capability for data in channel Q. There are three different modes which may be specified for channel Q, each of which carries different data and has a different function. The mode of channel Q is specified by setting the appropriate value in address word 2206. Also note that address word 2206 does not perform any actual addressing, such as sector addressing, and is used solely to specify the mode of channel Q. Address word 2206 is denoted herein by the term "address" to conform with the terminology employed in the Red Book.

A mode 1 channel Q sequence 2212 is specified by putting a binary 1 in address word 2206. In mode 1 channel Q sequence 2212, data Q field 2208 contains a track number 2214 (8 bits), an index 2216 (8 bits), a track minutes word TMIN 2218 (8 bits), a track seconds word TSEC 2220 (8 bits), a track frame word TFRAME 2222 (8 bits), a zero word 2224 (8 bits), an absolute minutes word AMIN 2226 (8 bits), an absolute seconds word ASEC 2228 (8 bits), an absolute frame word AFRAME 2230 (8 bits). TMIN 2218, TSEC 2220, and TFRAME 2222 combine to give the running time in minutes, seconds, and fractions within each audio track. AMIN 2226, ASEC 2228, and AFRAME 2230, however, combine to give the absolute time in minutes, seconds, and fractions from the beginning of the audio compact disc, and are collectively referred to as ATIME 2232. ATIME 2232 is used for sector addressing, and the Red Book specifies that ATIME 2232 be unique for each sector. It is thus the ATIME of channel Q that is utilized to provide a unique addressing for each sector of an audio compact disc. (It should be noted that both the TFRAME and AFRAME are expressed in terms of sector count, from 0 at the start of a one-second interval to 74 at the end of the one-second interval, because 75 sectors of audio data constitute one second of playing time. The terminology "FRAME" used herewith by the Red Book standard is not to be confused with the data frame 140 in FIG. 1.) A mode 2 channel Q sequence 2234 is specified by putting a binary 2 in address word 2206. In mode 2 channel Q sequence 2234, data Q field 2208 contains an N field 2236 (52 bits), a zero word 2238 (12 bits), and AFRAME 2230 (8 bits). N field 2236 is used to record the UPC/EAN catalog number of the audio compact disc.

A mode 3 channel Q sequence 2240 is specified by putting a binary 3 in address word 2206. In mode 3 channel Q sequence 2240, data Q field 2208 contains an ISRC field 2242 (60 bits), a zero word 2244 (8 bits), and AFRAME 2230 (8 bits). ISRC field 2242 is used to give a unique number to an audio track.

Figure 3:
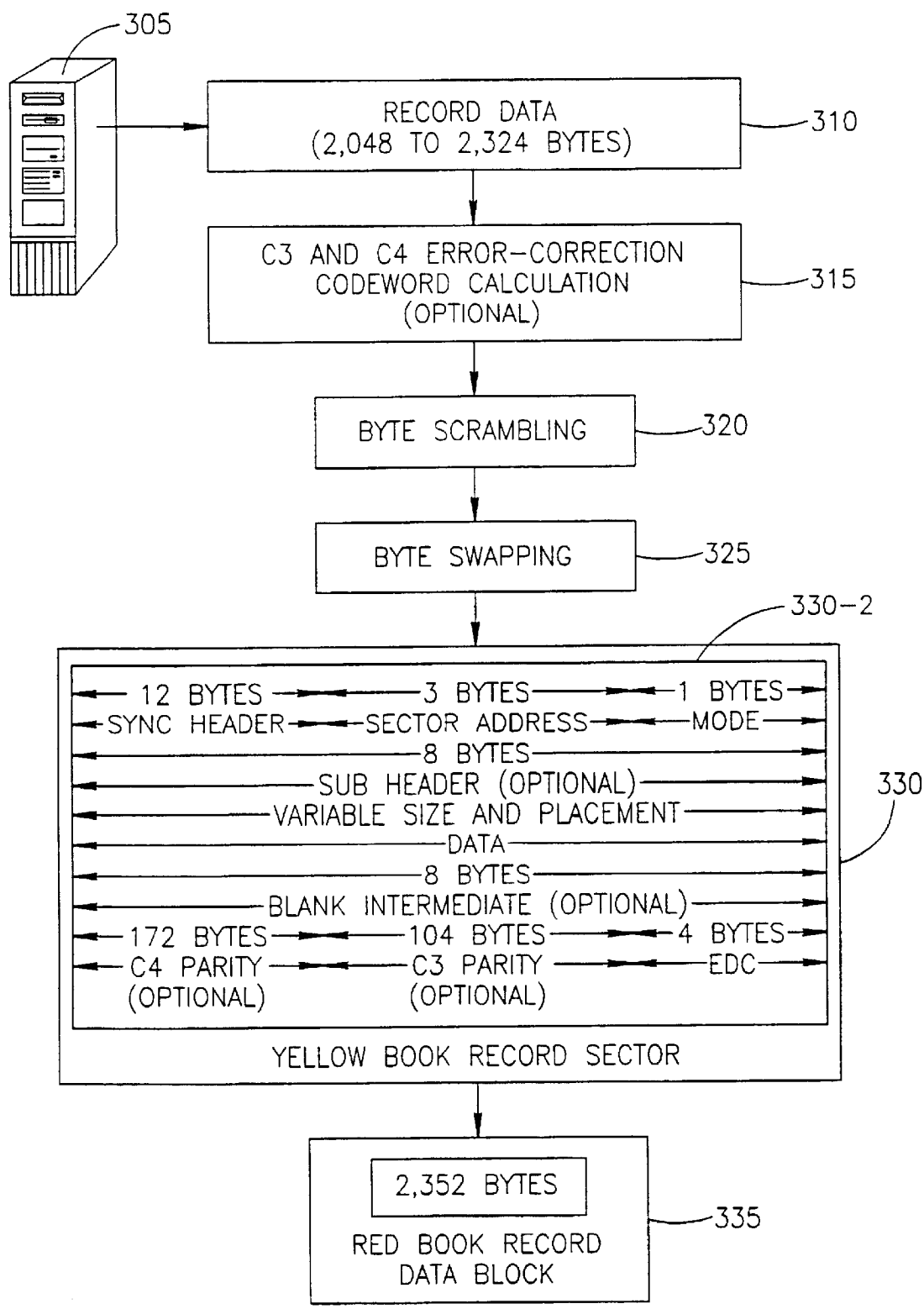
FIG. 3 illustrates the prior-art data format and recording process for a CD-ROM according to the Yellow Book standard.
Figure 4:
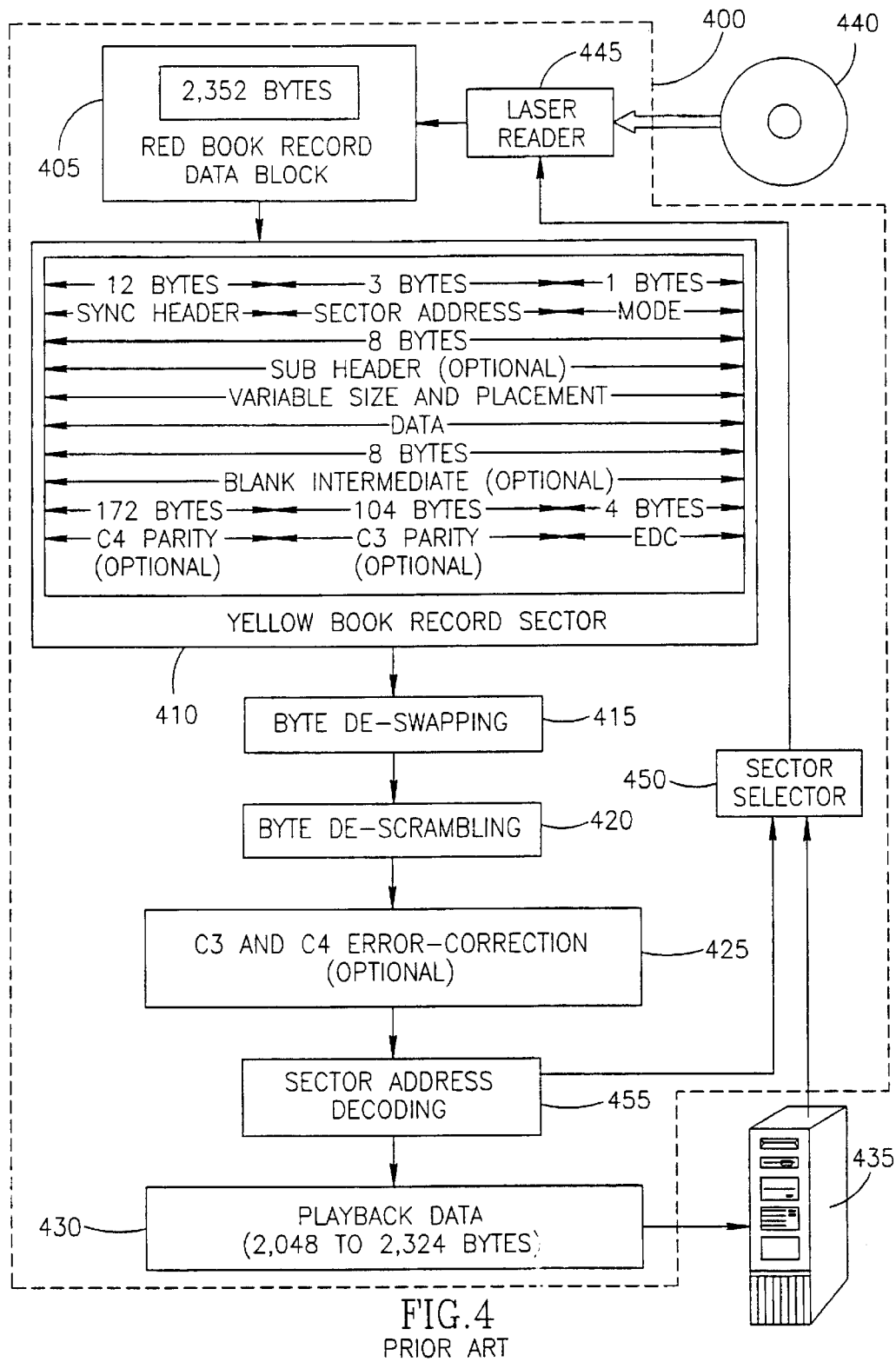
FIG. 4 illustrates the prior-art data format and playback process for a CD-ROM according to the Yellow Book standard.
Figure 5:
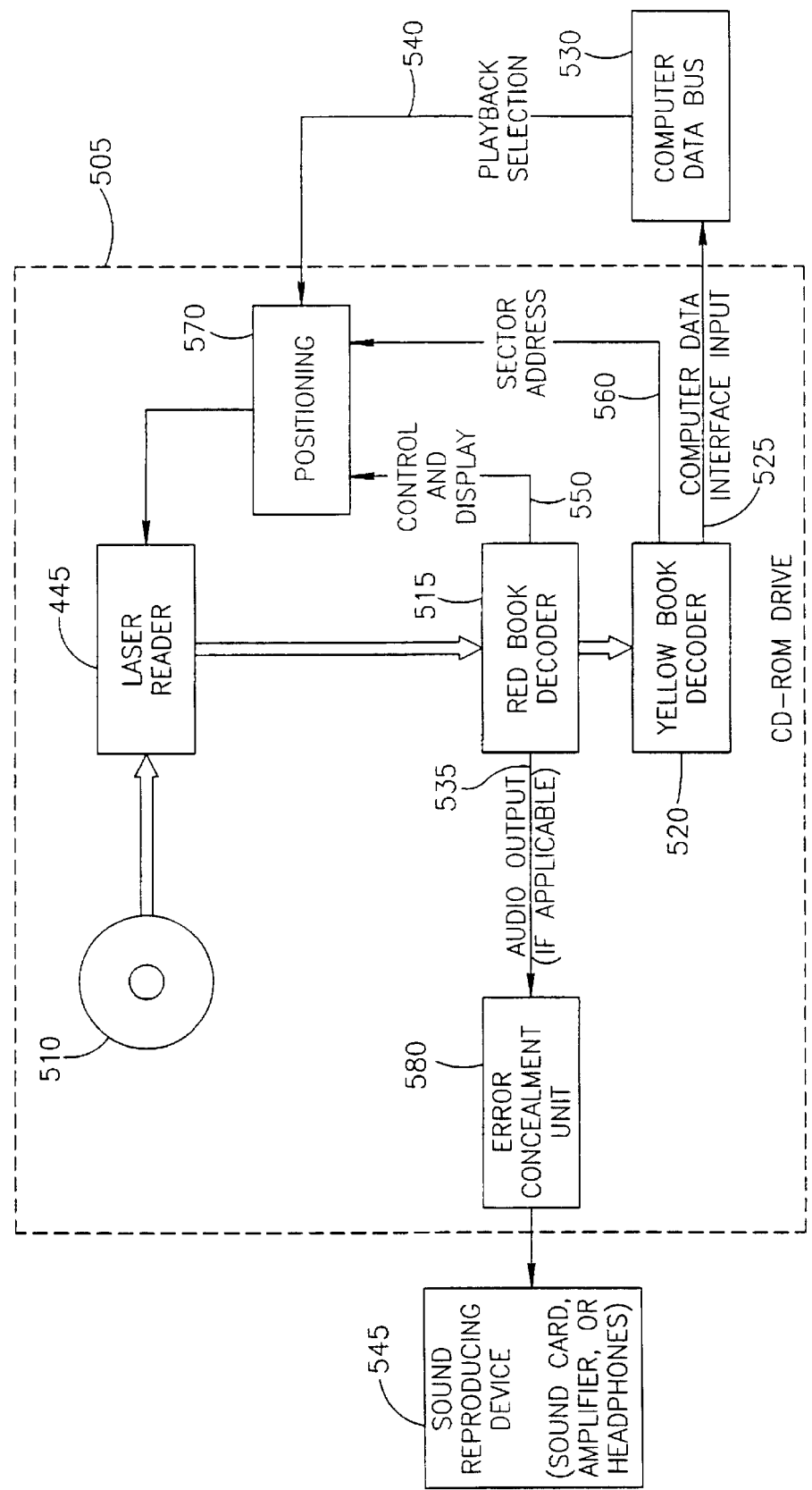
FIG. 5 is a block diagram conceptually illustrating the data flow and output channels of a prior art CD-ROM drive.

Reference to FIG. 3 shows that for CD-ROMs, the Yellow Book standard specifies a 3-byte sector address 330-2 at the beginning of each Yellow Book record sector 330. When a CD-ROM drive reads data from a CD-ROM, it is sector address 330-2 which is used by the CD-ROM drive to locate the desired sector for data retrieval. For audio compact discs, however, the Red Book specifies that all 2,352 bytes of sector data be used for audio purposes only, and therefore such sector addressing cannot be embedded within the main data channel of the sectors of an audio compact disc. Consequently, when a CD-ROM drive is used to read the audio data of an audio compact disc, only ATIME 2230 (FIG. 22) is available to identify the sector address of the current sector. Thus, a copy-protected audio compact disc according to the present invention can optionally contain a "position-disabled channel Q" which is a region of channel Q that normally has position reference information, but which has been altered to be unable to provide position reference information for a CD-ROM drive. There are several ways to produce a position-disabled channel Q, as described below.

As previously noted, Spitzenberger discloses a copy-protection method which relies on placing incorrect sector addresses on the compact disc. According to Spitzenberger, these incorrect sector addresses may be placed in sector address 330-2 (FIG. 3) or within a subcode channel, which in the case of an audio compact disc is channel Q 2140 (FIG. 21). Some CD-ROM drives are unable to locate sectors for copying when there is such invalid sector address information on the compact disc, However, as noted, this by itself is not effective in preventing unauthorized copying via many CD-ROM drives. The method and system of the current invention, however, is able to successfully interfere with copying on such CD-ROM drives by placing suitable noise on the unauthorized copies. Nevertheless, it is still desirable to reinforce the copy-protection of latent noise on audio compact discs by selectively disabling positioning information, as discussed previously. In addition to the method of using invalid sector addressing as disclosed by Spitzenberger, there are other ways, as discussed below. In all these cases, copy-protection can be afforded by disabling the positioning information of channel Q.

It is first noted that channel Q can provide sector address information only when the mode has been selected as mode 1. According to an embodiment of the present invention, therefore, the positioning information of channel Q is disabled by selecting the channel Q mode to exclude mode 1, such as by changing the selection to mode 2 or mode 3, being sure to observe the Red Book standards regarding the use of data Q 2208 for these other modes. This will produce a position-disabled channel Q having a mode other than mode 1.

It is next noted that information in channel Q is subject to error-detection based on the CRC. According to common practice, if the CRC is zero, then error-detection is not applied. However, a non-zero CRC is used to detect errors in channel Q. Consequently, according to another embodiment of the present invention, the positioning information of channel Q is disabled by putting an invalid value into the CRC of channel Q, such as an invalid non-zero value. This will also produce a position-disabled channel Q having an invalid CRC.

The specific ways of disabling the positioning information of channel Q according to the present invention as presented above are distinct from the method disclosed by Spitzenberger, and are not related thereto, since they do not rely on changing sector address values.

Regardless of which embodiments according to the present invention for disabling the positioning information of channel Q are selected for implementation, disabling channel Q may be accomplished in the recording system as shown in FIG. 19 by incorporating a channel Q disabling unit 1965 between Red Book encoder 1920 and switch 1950. In one embodiment of the present invention, channel Q disabling unit 1965 selects the channel Q mode to exclude mode 1. In another embodiment of the present invention, channel Q disabling unit 1965 places an invalid CRC into channel Q.

Placement of Latent Noise and Channel Q Disabling

Figure 23:
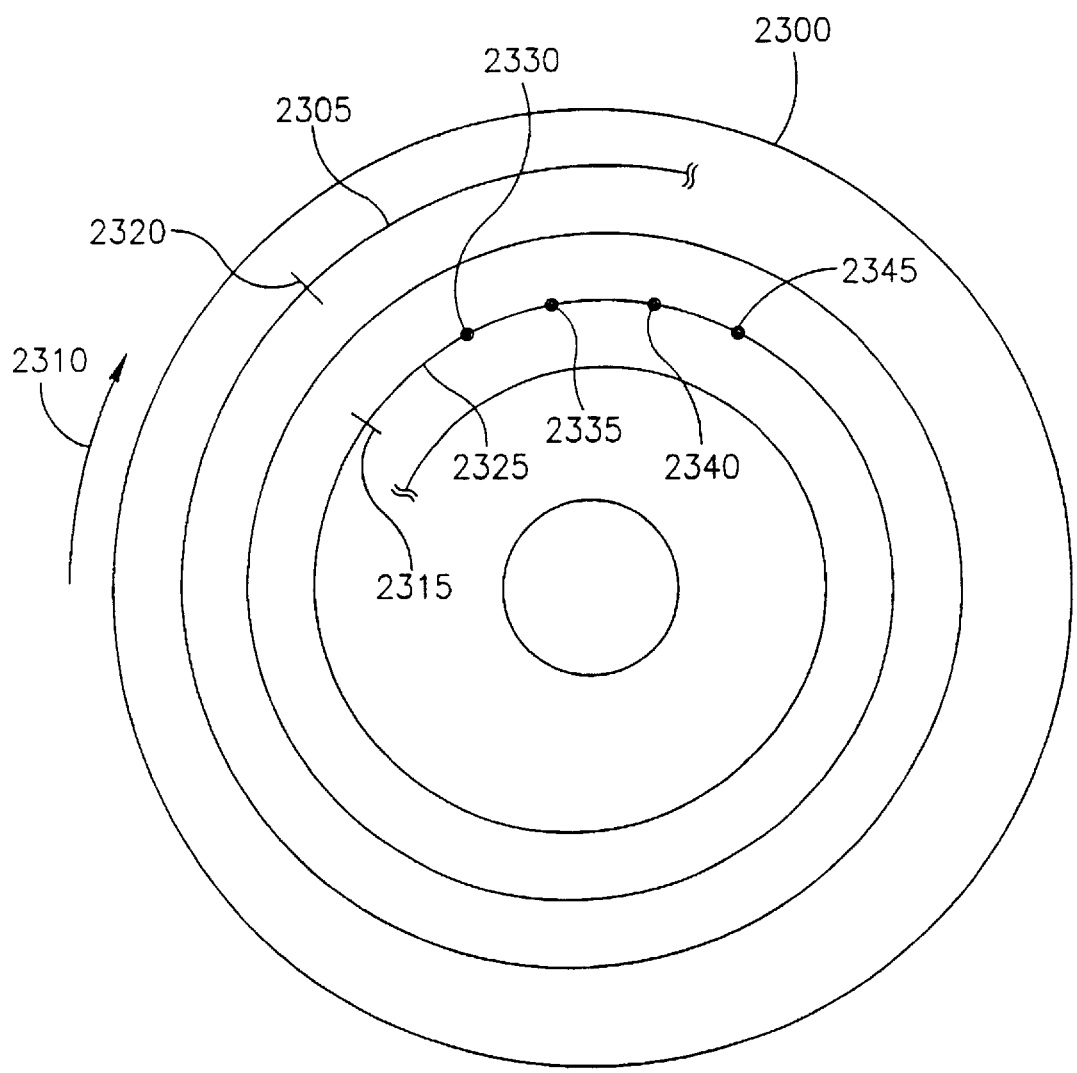
FIG. 23 conceptually illustrates the placement of copy-protection on an audio track of an audio compact disc according to the present invention.

FIG. 23 conceptually illustrates an audio compact disc 2300 containing a data track 2305, which is read by the laser reader (not shown) along a direction 2310. An audio data track 2325 extends from a starting point 2315 to an ending point 2320. Latent noise and disabling the positioning information of channel Q according to the present invention may be placed at convenient points within audio data track 2325, such as at points 2330, 2335, 2340, and 2345. The precise location is not important to the functioning of the copy-protection afforded thereby.

Distinction from Watermarking Schemes

It should be noted that the latent noise placed on the original compact disc according to the present invention is distinct from the placing of meaningful data thereon, as is done with various watermarking schemes. As is known in the art, it is possible to encode descriptive data within a digital representation of a content signal (such as audio or visual information) in such a way that the encoded descriptive data will remain with the content signal even if it undergoes further digital processing. The intent of such encoding is to embed copyright or other ownership data within the content signal in such a way that such ownership data cannot be readily removed from copies without seriously degrading the content signal quality, and will therefore serve to identify the source of the material within the copies, however such copies may be made. Such a watermarking method are disclosed, for example in U.S. Pat. Nos. 5,889,868 and 5,905,800, both to Moskowitz, et al. In a watermarking scheme, an important criterion to be observed is that the embedded watermarking data not perceptibly alter the playback of the content signal. The latent noise embedded within the content signal according to the present invention, however, is does not contain any information and is done to render an unauthorized copy unusable by perceptibly altering the playback of the content signal from an unauthorized copy. Therefore, the compact disc and method according to the present invention is not intended to provide any watermarking capabilities. Furthermore, watermarking itself does not provide any copy-protection capabilities.

While the invention has been described with respect to a limited number of embodiments, it will be appreciated that many variations, modifications and other applications of the invention may be made.

What is claimed is:

1. A method for producing a copy-protected audio compact disc containing a plurality of symbols within error-correction codewords representing audio data samples of an audio signal, by including latent noise on the copy-protected audio compact disc which does not interfere with the playback of the audio signal from the audio compact disc on an ordinary audio player, but which interferes with the unauthorized copying of the audio compact disc on an ordinary CD recorder and with the playback of an unauthorized copy of the audio compact disc made on an ordinary CD recorder, the method comprising the steps of:

(a) selecting at least one audio data sample of the audio signal;

(b) locating the data symbols representing said at least one audio data sample;

(c) overwriting said data symbols with erroneous symbols;

(d) locating the error-correction codewords which contain said data symbols; and (e) disabling the error-correction of said error-correction codewords.

2. The method as in claim 1, wherein said selecting at least one audio data sample selects a perfectly-concealable audio data sample having a previous audio data sample and a subsequent audio data sample, such that the value of said perfectly-concealable audio data sample substantially corresponds to a linear interpolation between said previous audio data sample and said subsequent audio data sample.

3. The method as in claim 1, wherein said erroneous symbols correspond to superimposed impulses.

4. The method as in claim 1, wherein the audio compact disc has a plurality of sectors and said selecting at least one audio data sample selects at least one audio data sample within each of a group of sectors selected from said plurality of sectors.

5. The method as in claim 1, wherein said error-correction codewords contain a plurality of parity symbols, said disabling the error-correction of said error-correction codewords comprising the step of overwriting at least one of said parity symbols with an arbitrary erroneous symbol.

6. The method as in claim 1, wherein said error-correction codewords contain a plurality of parity symbols, said disabling the error-correction of said error-correction codewords comprising the step of overwriting at least one of said parity symbols with an erasure.

7. The method as in claim 1, wherein the audio compact disc also contains a channel Q having positioning information, the method further comprising the step of disabling the positioning information of channel Q.

8. The method as in claim 7, wherein channel Q has a selectable mode including mode 1, said disabling the positioning information of channel Q comprising the selecting of the channel Q mode to exclude mode 1.

9. The method as in claim 7, wherein channel Q has a CRC, said disabling the positioning information of channel Q comprising the putting of an invalid value into the CRC.

10. A copy-protected audio compact disc containing a plurality of symbols representing audio data samples of an audio signal, and including latent noise which does not interfere with the playback of the audio signal from the audio compact disc on an ordinary audio player, but which interferes with the unauthorized copying of the audio compact disc on an ordinary CD recorder and with the playback of an unauthorized copy of the audio compact disc made on an ordinary CD recorder, the copy-protected audio compact disc comprising at least one erroneous symbol that does not correspond to the audio signal, and wherein said at least one erroneous symbol is contained within a disabled error-correction codeword.

11. The copy-protected audio compact disc as in claim 10, wherein said disabled error-correction codeword contains at least one arbitrary erroneous symbol.

12. The copy-protected audio compact disc as in claim 10, wherein said disabled error-correction codeword contains at least one erasure.

13. The copy-protected audio compact disc as in claim 10, further comprising a position-disabled channel Q.

14. The copy-protected audio compact disc as in claim 13, wherein said position-disabled channel Q comprises a mode other than mode 1.

15. The copy-protected audio compact disc as in claim 13, wherein said position-disabled channel Q comprises an invalid CRC.

16. A system for producing a copy-protected audio compact disc containing a plurality of symbols within error-correction codewords representing audio data samples of an audio signal, for including latent noise on the copy-protected audio compact disc which does not interfere with the playback of the audio signal from the audio compact disc on an ordinary audio player, but which interferes with the unauthorized copying of the audio compact disc on an ordinary CD recorder and with the playback of an unauthorized copy of the audio compact disc made on an ordinary CD recorder, the system comprising:

(a) an audio data source providing audio data samples to be recorded onto a copy-protected audio compact disc;

(b) a Red Book encoder for encoding said audio data samples;

(c) a noise generator for generating the latent noise;

(d) a codeword disabling unit for disabling error-correction codewords;

(e) a recording laser;

(f) a laser controller for controlling said recording laser;

(g) a switch for selecting between the output of said Red Book encoder and the output of said codeword disabling unit, and for passing the selected output to said laser controller.

17. The system as in claim 16, wherein the audio compact disc contains a channel Q, the system further comprising a channel Q disabling unit.

18. The system as in claim 17, wherein the channel Q has a selectable mode including mode 1, said channel Q disabling unit further operative to excluding mode 1.

19. The system as in claim 17, wherein the channel Q has a CRC, said channel Q disabling unit further operative to putting an invalid value into the CRC.

* * * * *